(12) United States Patent
Ludwig et al.

(10) Patent No.: US 9,026,717 B2
(45) Date of Patent: May 5, 2015

(54) APPARATUS, SYSTEM, AND METHOD FOR A PERSISTENT OBJECT STORE

(75) Inventors: Jonathan Ludwig, Lehi, UT (US); Ethan Barnes, Pleasant Grove, UT (US); Drex Dixon, South Jordan, UT (US)

(73) Assignee: Sandisk Technologies, Inc., Plano, TX (US)

( * ) Notice: Subject to any disclaimer, the term of this patent is extended or adjusted under 35 U.S.C. 154(b) by 762 days.

(21) Appl. No.: 13/250,943

(22) Filed: Sep. 30, 2011

(65) Prior Publication Data
US 2013/0086303 A1 Apr. 4, 2013

(51) Int. Cl.
G06F 12/00 (2006.01)
G06F 21/80 (2013.01)
G06F 12/02 (2006.01)
G06F 21/00 (2013.01)
G06F 21/79 (2013.01)
G06F 3/06 (2006.01)
G06F 17/30 (2006.01)

(52) U.S. Cl.
CPC ............ *G06F 21/80* (2013.01); *G06F 12/0246* (2013.01); *G06F 21/00* (2013.01); *G06F 21/79* (2013.01); *G06F 3/06* (2013.01); *G06F 17/30091* (2013.01)

(58) Field of Classification Search
USPC .......................................... 711/103
See application file for complete search history.

(56) References Cited

U.S. PATENT DOCUMENTS

| | | | |
|---|---|---|---|
| 6,772,313 B2 | 8/2004 | Oh | |
| 6,868,496 B2 | 3/2005 | Sales et al. | |
| 7,134,006 B2 | 11/2006 | Flanigan | |
| 7,689,609 B2 * | 3/2010 | Lango et al. | 707/679 |
| 2009/0150599 A1 * | 6/2009 | Bennett | 711/103 |
| 2011/0265176 A1 * | 10/2011 | Khosrowpour et al. | 726/19 |
| 2012/0303865 A1 * | 11/2012 | Hars | 711/103 |

OTHER PUBLICATIONS

"HPA-Host Protected Area", Westdata, Jan. 15, 2010, pp. 3, http://www.datarecoverytools.co.uk/2010/01/15/hpa-host-protected-area/.
Stevens, Curtis E. "Information Technology—Protected Area Run Time Interface Extension Services", Phoenix Technologies Ltd, Sep. 30, 2000, pp. 31, Working Draft, Revision 3, ANSI NCITS.***200x.

* cited by examiner

*Primary Examiner* — Matthew Bradley
*Assistant Examiner* — Craig Goldschmidt
(74) *Attorney, Agent, or Firm* — Stoel Rives LLP

(57) ABSTRACT

An apparatus, system, and method are disclosed for persistently storing data objects. An object store index module maintains an object store. The object store associates each data object of a plurality of data objects with a unique key value. A storage module persists object store data defining the object store to a logical block address of the solid-state storage device in response to an update event. The logical block address is a member of a restricted set of logical block addresses. The logical block address is mapped to a location of the object store data on the solid-state storage device. A read module provides a requested data object from the plurality of data objects to a requesting client in response to receiving a read request for the requested data object from the requesting client. The read request comprises the key value associated with the requested data object.

18 Claims, 11 Drawing Sheets

APPARATUS, SYSTEM, AND METHOD FOR A PERSISTENT OBJECT STORE

FIELD OF THE INVENTION

This invention relates to data objects and more particularly relates to persistently storing data objects in a restricted set of logical addresses.

BACKGROUND

Description of the Related Art

Data stored in a storage device is often accessible using a block device interface. The data is typically visible and accessible to any client with access to the storage device. Operating systems or other storage clients can erase data from the storage device, format the storage device, and otherwise manipulate and change the data.

Further, if a storage device is transferred from one host device to another, there is typically little or no storage client context for the data on the storage device. Settings and other configuration data for the storage device are also typically lost in the transfer. The storage device then either reverts to default settings or will not function properly.

SUMMARY

From the foregoing discussion, it should be apparent that a need exists for an apparatus, system, and method that persistently store data objects. Beneficially, such an apparatus, system, and method would maintain data objects in a restricted set of logical addresses.

The present invention has been developed in response to the present state of the art, and in particular, in response to the problems and needs in the art that have not yet been fully solved by currently available storage devices. Accordingly, the present invention has been developed to provide an apparatus, system, and method for persistently storing data objects that overcome many or all of the above-discussed shortcomings in the art.

A method of the present invention is presented for persistently storing data objects. In one embodiment, the method includes maintaining an object store. The object store, in a further embodiment, associates each data object of a plurality of data objects with a unique key value. The method, in another embodiment, includes persisting object store data defining the object store to a logical block address of a solid-state storage device in response to an update event. In one embodiment, the logical block address is a member of a restricted set of logical block addresses of the solid-state storage device. In a further embodiment, the logical block address is mapped to a location of the object store data on the solid-state storage device. In an additional embodiment, the method includes providing a requested data object from the plurality of data objects to a requesting client in response to receiving a read request for the requested data object from the requesting client. The read request, in one embodiment, includes the key value associated with the requested data object.

In a further embodiment, the method includes storing a received data object as an entry in an index for the object store in response to a size of the received data object satisfying a size threshold. In another embodiment, the method includes storing the received data object at an associated logical block address of the solid-state storage device in response to the size of the received data object being greater than the size threshold. The associated logical block address, in one embodiment, is a member of the restricted set of logical block addresses.

In certain embodiments, persisting the object store data to the logical block address comprises inserting the object store data into a write path for the solid-state storage device. The write path, in a further embodiment, includes both the object store data and workload data so that the object store data receives the same data protection characteristics as the workload data. In another embodiment, persisting the object store data to the logical block address of the solid-state storage device comprises writing the object store data to an append point of a sequential log-based writing structure persisted on the solid-state storage device. The sequential log-based writing structure, in one embodiment, stores the object store data and workload data. In a further embodiment, the sequential log-based writing structure stores the object store data and the workload data using a mapping structure maintained by a storage controller. In one embodiment, the mapping structure associates logical block addresses of a logical address space of the solid-state storage device with physical storage locations of the solid-state storage device for the object store data and the workload data.

The logical block address for the object store data, in one embodiment, is a member of a sparse address space that is greater than a physically addressable capacity of the solid-state storage device. The sparse address space, in a further embodiment, comprises a first set of logical block addresses that is available to clients of the solid-state storage device through a block device interface and the restricted set of logical block addresses that is unavailable to clients of the solid-state storage device through the block device interface. In one embodiment, data stored in the restricted set of logical block addresses is available to clients of the solid-state storage device exclusively through an object store interface. In a further embodiment, data stored in the restricted set of logical block addresses is unavailable to clients of the solid-state storage device through a block device interface.

The method, in one embodiment, includes mapping a universal client identifier for the requesting client to an object store client identifier for the requesting client using a known mapping. One or more key values and associated data objects of the object store, in certain embodiments, are associated with the object store client identifier. Clients of a same client type, in one embodiment, share a same object store client identifier and are associated with a same set of key values and associated data objects of the object store.

In another embodiment, the method includes adding a received data object to the object store in response to receiving a write request from the requesting client. The method, in a further embodiment, includes receiving a key value associated with the received data object from the requesting client with the write request. In another embodiment, the method includes generating a key value associated with the received data object in response to receiving the write request and sending the generated key value to the requesting client.

In one embodiment, each key value comprises one or more of a client identifier, a section identifier, and a key identifier. The client identifier, in one embodiment, is associated with the requesting client. The section identifier, in another embodiment, is associated with a group of data objects comprising an associated data object, the group having a common characteristic. The key identifier, in an additional embodiment, identifies the associated data object. The plurality of data objects, in various embodiments, may include cache binding information, startup configuration information, runtime configuration information, license information, device driver software, data map information, a logical to physical mapping structure, and/or recovery information for the solid-state storage device.

An apparatus for persistently storing data objects is provided with a plurality of modules configured to functionally execute the necessary steps of the method described above. These modules in the described embodiments include an object store index module, a storage module, a read module, a write module, and an identifier mapping module.

In one embodiment, the object store index module maintains an object store. The object store, in a further embodiment, associates each data object of a plurality of data objects with a unique key value. The storage module, in another embodiment, intermingles object store data defining the object store with workload data on solid-state storage media of a solid-state storage device so that the object store data receives the same data protection characteristics as the workload data. The object store data, in one embodiment, is stored at a logical block address that is a member of a restricted set of logical block addresses of the solid-state storage device. The logical block address, in a further embodiment, is mapped to a location of the object store data on the solid-state storage media of the solid-state storage device. In another embodiment, the read module provides a requested data object from the plurality of data objects to a requesting client in response to receiving a read request for the requested data object from the requesting client. The read request, in certain embodiments, includes the key value associated with the requested data object.

In one embodiment, the write module stores a received data object as an entry in an index for the object store in response to a size of the received data object satisfying a size threshold. In another embodiment, the write module stores the received data object at an associated logical block address of the solid-state storage device in response to the size of the received data object being greater than the size threshold. The associated logical block address, in a further embodiment, is a member of the restricted set of logical block addresses.

The identifier mapping module, in one embodiment, maps a universal client identifier for the requesting client to an object store client identifier for the requesting client using a known mapping. In another embodiment, one or more key values and associated data objects of the object store are associated with the object store client identifier. In certain embodiments, the storage module intermingles the object store data with the workload data by writing the object store data to an append point of a sequential log-based writing structure persisted on the solid-state storage device. The sequential log-based writing structure, in one embodiment, stores the object store data and the workload data. Data stored in the restricted set of logical block addresses, in one embodiment, is available to clients of the solid-state storage device exclusively through an object store interface. In another embodiment, data stored in the restricted set of logical block addresses is unavailable to clients of the solid-state storage device through a block device interface.

A system of the present invention is also presented for storing data objects. The system may be embodied by a solid-state storage device and a device driver comprising an object store index module, a storage module, and a read module. In particular, the system, in one embodiment, includes a host device.

The solid-state storage device, in one embodiment, is in communication with the host device. The solid-state storage device, in certain embodiments, includes a restricted set of logical block addresses. In one embodiment, the device driver is for the solid-state storage device. The device driver, in a further embodiment, is executing on the host device.

In one embodiment, the device driver comprises the object store index module, the storage module, and the read module. The object store index module, in a further embodiment, maintains an object store. The object store, in one embodiment, associates each data object of a plurality of data objects with a unique key value. The storage module, in another embodiment, persists object store data defining the object store to a logical block address of the solid-state storage device in response to an update event. The logical block address, in a further embodiment, is a member of the restricted set of logical block addresses. In one embodiment, the logical block address is mapped to a location of the object store data on the solid-state storage device. In another embodiment, the read module provides a requested data object from the plurality of data objects to a requesting client in response to receiving a read request for the requested data object from the requesting client. The read request, in one embodiment, comprises the key value associated with the requested data object.

In one embodiment, the device driver for the solid-state storage device provides access to data stored in the restricted set of logical block addresses exclusively through an object store interface. In another embodiment, the device driver for the solid-state storage device provides access to data stored in logical block addresses associated with a reported capacity of the solid-state storage device through a block device interface for the solid-state storage device. Data stored in the restricted set of logical block addresses, in a further embodiment, is unavailable through the block device interface. In one embodiment, the requesting client comprises one of a plurality of clients executing on the host device. The plurality of clients, in certain embodiments, are in communication with the solid-state storage device through the device driver.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
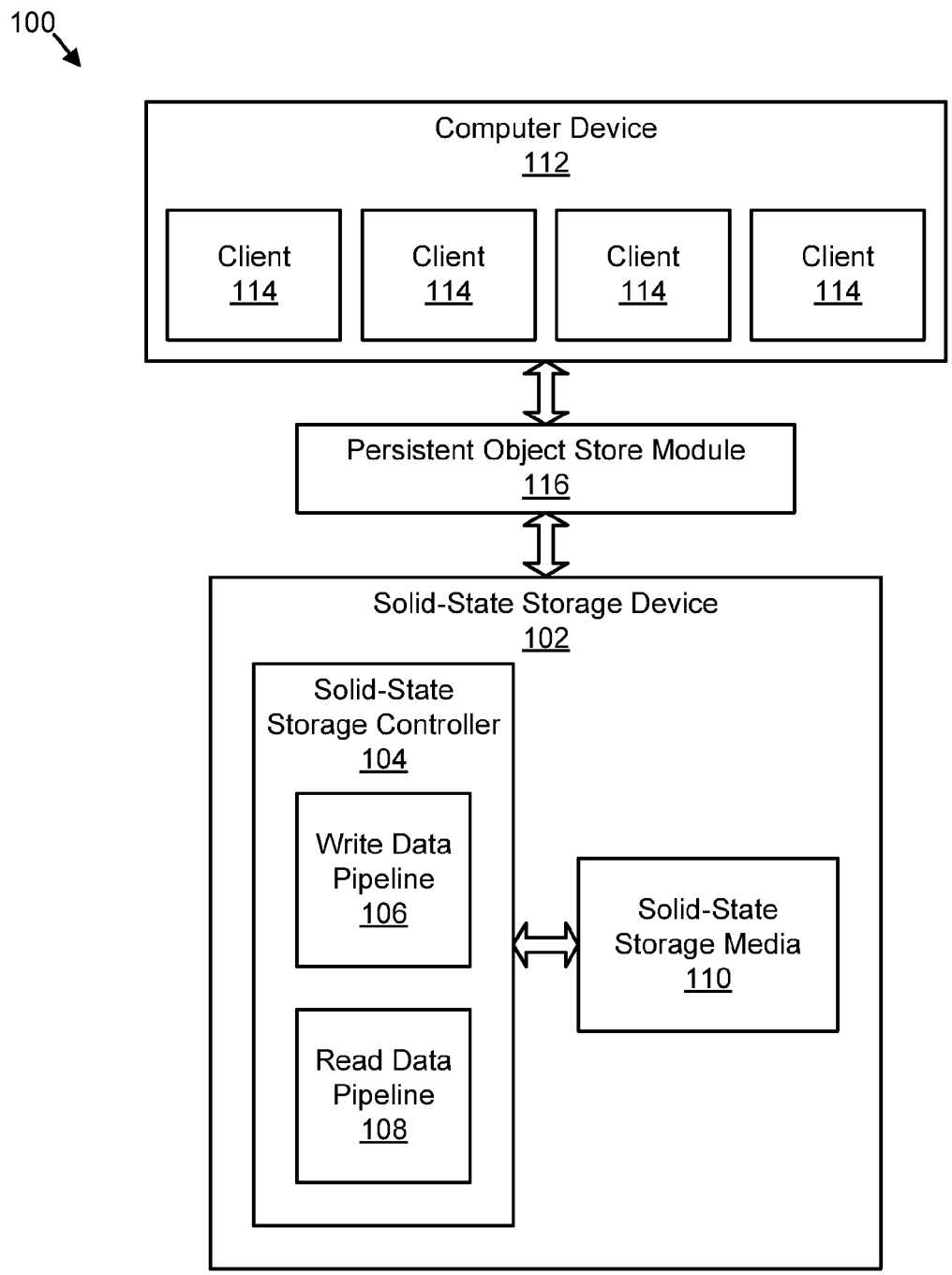
FIG. 1 is a schematic block diagram illustrating one embodiment of a system for persistently storing data objects in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Solid-State Storage System

FIG. 1 depicts one embodiment of a system 100 for persistently storing data objects. The system 100 includes a solid-state storage device 102, a solid-state storage controller 104, a write data pipeline 106, a read data pipeline 108, a solid-state storage media 110, a computer device 112, several clients 114, and a persistent object store module 116, which are described below.

The system 100 includes at least one solid-state storage device 102. In another embodiment, the system 100 includes two or more solid-state storage devices 102. Each solid-state storage device 102 may include non-volatile, solid-state storage media 110, such as flash memory, nano random access memory ("nano RAM or NRAM"), nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), magneto-resistive RAM ("MRAM"), dynamic RAM ("DRAM"), phase change RAM ("PRAM"), etc. The solid-state storage device 102 is described in more detail with respect to FIGS. 2 and 3. The solid-state storage device 102 is depicted in communication with several clients 114 executing on a computer device 112.

In one embodiment, the solid-state storage device 102 is internal to the computer device 112 and is connected using a system communications bus, such as a peripheral component interconnect express ("PCI-e") bus, a Serial Advanced Technology Attachment ("serial ATA") bus, or the like. In another embodiment, the solid-state storage device 102 is external to the computer device 112 and is connected using an external communications bus, such as a universal serial bus ("USB")

connection, an Institute of Electrical and Electronics Engineers ("IEEE") 1394 bus ("FireWire"), or the like. In other embodiments, the solid-state storage device 102 is connected to the computer device 112 using a peripheral component interconnect ("PCI") express bus using external electrical or optical bus extension or bus networking solution such as Infiniband or PCI Express Advanced Switching ("PCIe-AS"), or the like.

In various embodiments, the solid-state storage device 102 may be in the form of a dual-inline memory module ("DIMM"), a daughter card, or a micro-module. In another embodiment, the solid-state storage device 102 is an element within a rack-mounted blade. In another embodiment, the solid-state storage device 102 is contained within a package that is integrated directly onto a higher level assembly (e.g. mother board, lap top, graphics processor). In another embodiment, individual components comprising the solid-state storage device 102 are integrated directly onto a higher level assembly without intermediate packaging.

The solid-state storage device 102 includes one or more solid-state storage controllers 104, each may include a write data pipeline 106 and a read data pipeline 108 and each includes a solid-state storage media 110, which are described in more detail below with respect to FIGS. 2 and 3.

The system 100 includes one or more computer devices 112 connected to the solid-state storage device 102. A computer device 112 may be a host device, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a computer device 112 may be a client and the solid-state storage device 102 operates autonomously to service data requests sent from the computer device 112. In this embodiment, the computer device 112 and solid-state storage device 102 may be connected using a computer network, system bus, or other communication means suitable for connection between a computer device 112 and an autonomous solid-state storage device 102. The computer device 112 is one embodiment of a host device for the solid-state storage device 102.

In one embodiment, the computer device 112 and/or the one or more clients 114 may be connected to the solid-state storage device 102 through one or more computer networks. In one embodiment, the client 114 operates within the computer device 112. The client 114 may be an application, a server, an applet, a thread, a driver, a database management system, a daemon, or the like. In another embodiment, a client 114 may include hardware, such as a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. A computer network may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. A computer network may also include a network from the IEEE 802 family of network technologies, such Ethernet, token ring, WiFi, WiMax, and the like.

A computer network may include servers, switches, routers, cabling, radios, and other equipment used to facilitate networking computers device 112, clients 114, and/or the solid-state storage device 102. In one embodiment, the system 100 includes multiple computer devices 112 that communicate as peers over a computer network. In another embodiment, the system 100 includes multiple solid-state storage devices 102 that communicate as peers over a computer network. One of skill in the art will recognize other computer networks and related equipment with single or redundant connections between one or more clients 114 and/or computer devices 112 with one or more solid-state storage devices 102 or with one or more solid-state storage devices 102 connected to one or more computer devices 112. In one embodiment, the system 100 includes two or more solid-state storage devices 102 connected through a computer network to a client 114 without a computer device 112.

In the depicted embodiment, the one or more clients 114 are in communication with the solid-state storage device 102 through the persistent object store module 116. In certain embodiments, the one or more clients 114 may also be in communication with the solid-state storage device 102 through a block device interface. The persistent object store module 116 maintains one or more object stores that associate data objects with unique key values, and provides the data objects to the clients 114 in exchange for the corresponding key values.

The persistent object store module 116 persists data objects and other data of an object store on the solid-state storage media 110 of the solid-state storage device 102. In one embodiment, the persistent object store module 116 stores data objects in a restricted set of logical block addresses of the solid-state storage device 102, so that the data objects are only available to clients 114 through the persistent object store module 116. The restricted set of logical block addresses may be unavailable and substantially invisible to clients 114 on a block device interface. The persistent object store module 116, in a further embodiment, stores data objects and other data of a object store on the solid-state storage media 110 together with workload or user data, so that the object store data receives the same data protection as the workload data. In this manner, the data objects may be logically separated from workload data, but physically intermingled with workload data on the solid-state storage media 110.

In certain embodiments, persistent data objects may include cache binding information, startup configuration information, runtime configuration information, license information, device driver software, data map information, logical to physical mapping information, recovery information, or other objects for the solid-state storage device 102. In other embodiments, persistent data objects may include parameters, settings, profiles, software, data files, or other objects for clients 114. By persistently storing data objects indexed by key values, the persistent object store module 116 maintains the data objects across pairings with different computer devices 112, for different clients 114, and the like.

Other types of protected storage areas are only hidden until opened or unlocked using a special command or setting, at which point the protected storage area is typically visible and available to any client 114 using a standard block device interface. In direct contrast to these other types of protected storage areas, the persistent object store module 116 does not provide data objects to clients 114 using a block device interface, so that data objects in an object store of the persistent object store module 116 are not inadvertently unlocked or made visible to other clients 114, but are available exclusively through an object store interface or application program interface ("API") of the persistent object store module 116.

Solid-State Storage Device

Figure 2:
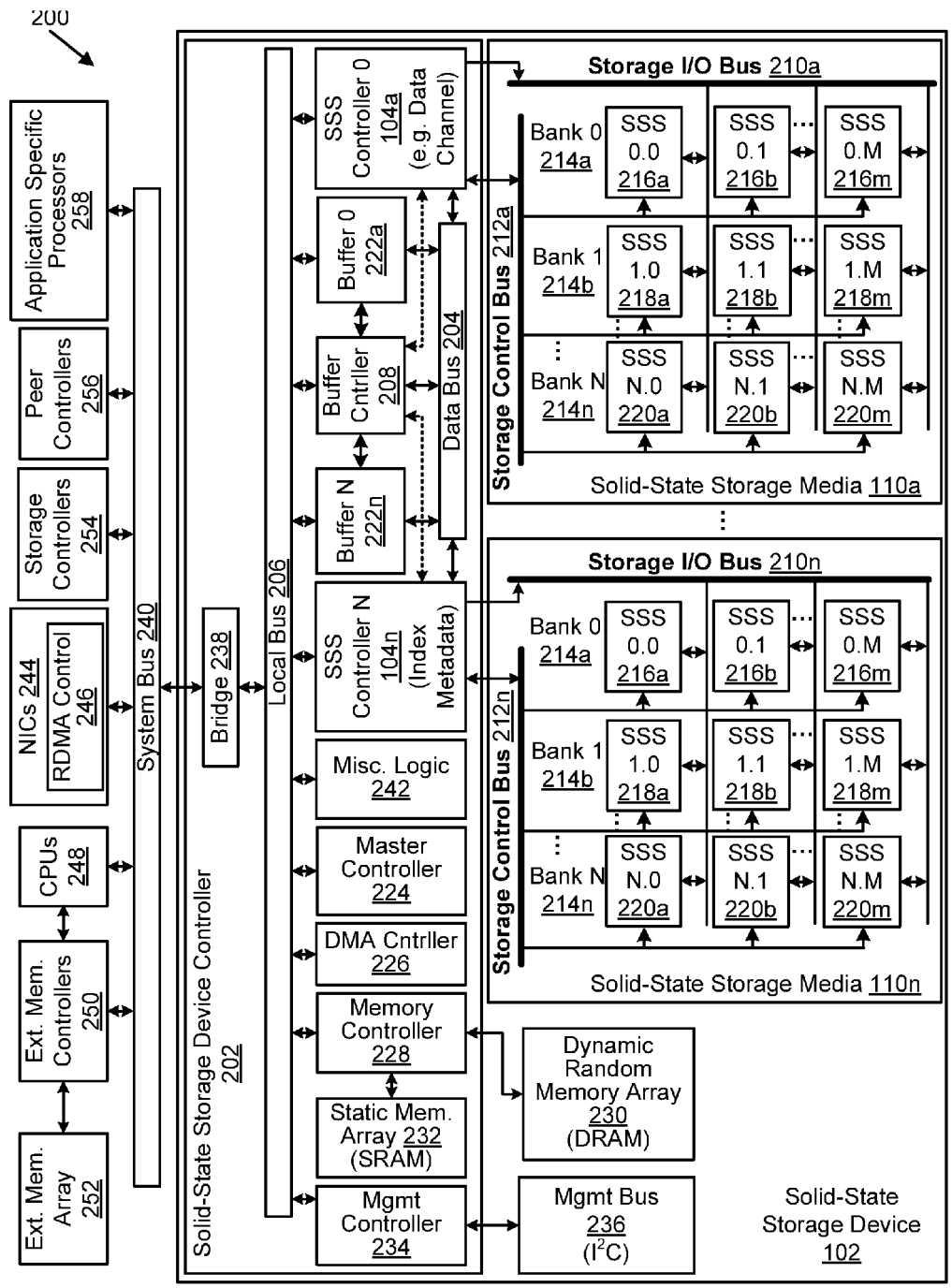
FIG. 2 is a schematic block diagram illustrating one embodiment of a solid-state storage device controller in a solid-state storage device in accordance with the present invention.

FIG. 2 depicts one embodiment 200 of a solid-state storage device controller 202 that includes a write data pipeline 106 and a read data pipeline 108 in a solid-state storage device 102. The solid-state storage device controller 202 may be embodied as hardware, as software, or as a combination of hardware and software. The solid-state storage device controller 202 may include a number of solid-state storage controllers 0-N 104a-n, each controlling solid-state storage media 110.

In the depicted embodiment, two solid-state controllers are shown: solid-state controller 0 104a and solid-state storage controller N 104n, and each controls solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid-state controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 is field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid-state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a row of solid-state storage elements 216a, 216b, 216m is designated as a bank 214.

As depicted, there may be "n" banks 214a-n and "m" solid-state storage elements 216a-m, 218a-m, 220a-m per bank in an array of n×m solid-state storage elements 216, 218, 220 in a solid-state storage media 110. Of course different embodiments may include different values for n and m. In one embodiment, the solid-state storage media 110a includes twenty solid-state storage elements 216, 218, 220 per bank 214 with eight banks 214. In one embodiment, the solid-state storage media 110a includes twenty four solid-state storage elements 216, 218, 220 per bank 214 with eight banks 214. In addition to the n×m storage elements 216, 218, 220, one or more additional columns (P) may also be addressed and operated in parallel with other solid-state storage elements 216a, 216b, 216m for one or more rows. The added P columns in one embodiment, store parity data for the portions of an ECC chunk (i.e. an ECC codeword) that span m storage elements for a particular bank. In one embodiment, each solid-state storage element 216, 218, 220 is comprised of single-level cell ("SLC") devices. In another embodiment, each solid-state storage element 216, 218, 220 is comprised of multi-level cell ("MLC") devices.

In one embodiment, solid-state storage elements that share a common storage I/O bus 210a (e.g. 216b, 218b, 220b) are packaged together. In one embodiment, a solid-state storage element 216, 218, 220 may have one or more dies per chip with one or more chips stacked vertically and each die may be accessed independently. In another embodiment, a solid-state storage element (e.g. SSS 0.0 216a) may have one or more virtual dies per die and one or more dies per chip and one or more chips stacked vertically and each virtual die may be accessed independently. In another embodiment, a solid-state storage element SSS 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 8.0) 216a-220a, each in a separate bank 214a-n. In another embodiment, 24 storage elements (e.g. SSS 0.0-SSS 0.24) 216 form a logical bank 214a so that each of the eight logical banks has 24 storage elements (e.g. SSS0.0-SSS 8.24) 216, 218, 220. Data is sent to the solid-state storage media 110 over the storage I/O bus 210 to all storage elements of a particular group of storage elements (SSS 0.0-SSS 8.0) 216a, 218a, 220a. The storage control bus 212a is used to select a particular bank (e.g. Bank 0 214a) so that the data received over the storage I/O bus 210 connected to all banks 214 is written just to the selected bank 214a.

In a one embodiment, the storage I/O bus 210 is comprised of one or more independent I/O buses ("IIOBa-m" comprising 210a.a-m, 210n.a-m) wherein the solid-state storage elements within each column share one of the independent I/O buses that accesses each solid-state storage element 216, 218, 220 in parallel so that all banks 214 are accessed simultaneously. For example, one channel of the storage I/O bus 210 may access a first solid-state storage element 216a, 218a, 220a of each bank 214a-n simultaneously. A second channel of the storage I/O bus 210 may access a second solid-state storage element 216b, 218b, 220b of each bank 214a-n simultaneously. Each row of solid-state storage element 216a, 216b, 216m is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. An erase block on a solid-state storage element 216, 218 220 may be called a physical erase block or "PEB." A typical page is 2000 bytes ("2 kB"). In one example, a solid-state storage element (e.g. SSS 0.0) includes two registers and can program two pages so that a two-register solid-state storage element 216, 218, 220 has a capacity of 4 kB. A bank 214 of 20 solid-state storage elements 216a, 216b, 216m would then have an 80 kB capacity of pages accessed with the same address going out the channels of the storage I/O bus 210.

This group of pages in a bank 214 of solid-state storage elements 216a, 216b, 216m of 80 kB may be called a logical page or virtual page. Similarly, an erase block of each storage element 216a-m of a bank 214a may be grouped to form a logical erase block or a virtual erase block. In one embodiment, an erase block of pages within a solid-state storage element 216, 218, 220 is erased when an erase command is received within a solid-state storage element 216, 218, 220. Whereas the size and number of erase blocks, pages, planes, or other logical and physical divisions within a solid-state storage element 216, 218, 220 are expected to change over time with advancements in technology, it is to be expected that many embodiments consistent with new configurations are possible and are consistent with the general description herein.

Typically, when a packet is written to a particular location within a solid-state storage element 216, 218, 220, wherein the packet is intended to be written to a location within a particular page which is specific to a particular physical erase block of a particular storage element of a particular bank, a physical address is sent on the storage I/O bus 210 and followed by the packet. The physical address contains enough information for the solid-state storage element 216, 218, 220 to direct the packet to the designated location within the page. Since all storage elements in a column of storage elements (e.g. SSS 0.0-SSS N.0 216a, 218a, 220a) are accessed simultaneously by the appropriate bus within the storage I/O bus 210a.a, to reach the proper page and to avoid writing the data packet to similarly addressed pages in the column of storage elements (SSS 0.0-SSS N.0 216a, 218a, 220a), the bank 214a that includes the solid-state storage element SSS 0.0 216a with the correct page where the data packet is to be written is simultaneously selected by the storage control bus 212.

Similarly, satisfying a read command on the storage I/O bus 210 requires a simultaneous signal on the storage control bus 212 to select a single bank 214a and the appropriate page within that bank 214a. In one embodiment, a read command reads an entire page, and because there are multiple solid-state storage elements 216a, 216b, 216m in parallel in a bank 214, an entire logical page is read with a read command. However, the read command may be broken into subcommands, as will be explained below with respect to bank interleave. A logical page may also be accessed in a write operation.

An erase block erase command may be sent out to erase an erase block over the storage I/O bus 210 with a particular erase block address to erase a particular erase block. Typically, an erase block erase command may be sent over the parallel paths of the storage I/O bus 210 to erase a logical erase block, each with a particular erase block address to erase a particular erase block. Simultaneously a particular bank (e.g. Bank 0 214a) is selected over the storage control bus 212 to prevent erasure of similarly addressed erase blocks in all of the banks (Banks 1-N 214b-n). Alternatively, no particular bank (e.g. Bank 0 214a) is selected over the storage control bus 212 to enable erasure of similarly addressed erase blocks in all of the banks (Banks 1-N 214b-n) simultaneously. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the solid-state storage media 110. For example, packets are streamed to the storage write buffers of a bank 214a of storage elements 216 and when the buffers are full, the packets are programmed to a designated logical page. Packets then refill the storage write buffers and, when full, the packets are written to the next logical page. The next logical page may be in the same bank 214a or another bank (e.g. 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the solid-state storage media 110. When a copy is made, new copy of the requested data is created and a new entry is created in the index mapping the new copy of the requested data to the original packets. The new copy of the requested data is also written to the solid-state storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the solid-state storage media 110 and allows the solid-storage device controller 202 to monitor storage hot spots and level usage of the various logical pages in the solid-state storage media 110. Sequentially writing packets also facilitates a powerful, efficient garbage collection system, which is described in detail below. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the computer device 112 or may be other devices.

Typically the solid-state storage controller(s) 104 communicate data to the solid-state storage media 110 over a storage I/O bus 210. In a typical embodiment where the solid-state storage is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of data independent busses 204. In one embodiment, each storage I/O bus 210 accessing a column of storage elements (e.g. 216a, 218a, 220a) may include a logical-to-physical mapping for storage divisions (e.g. erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104a-104n-1 and associated solid-state storage media 110a-110n-1 while at least one channel (solid-state storage controller 104n, solid-state storage media 110n) is dedicated to in-band metadata, such as index information and other metadata generated internally to the solid-state storage device 102.

The local bus 206 is typically a bidirectional bus or set of busses that allows for communication of data and commands between devices internal to the solid-state storage device controller 202 and between devices internal to the solid-state storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a computer device 112 or other device in which the solid-state storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The solid-state storage device 102 may be packaged to fit internally to a device or as an externally connected device.

The solid-state storage device controller 202 includes a master controller 224 that controls higher-level functions within the solid-state storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/solid-state storage device controller 202 manages multiple data storage devices/solid-state storage media 110a-n, the master controller 224 divides the work load among internal controllers, such as the solid-state storage controllers 104a-n. For example, the master controller 224 may divide an object to be written to the data storage devices (e.g. solid-state storage media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a computer device 112 or other device connected to the storage device/solid-state storage device 102 views the storage device/solid-state storage device 102 as a block storage device and sends data to specific physical addresses in the storage device/solid-state storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in the computer device 112, client 114, or other device wishing to use the storage device/solid-state storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a client 114 may have access to a computer network through an I/O memory driver using a standard stack API and operating in conjunction with NICs 244.

In one embodiment, the master controller 224 is also a redundant array of independent drive ("RAID") controller. Where the data storage device/solid-state storage device 102 is networked with one or more other data storage devices/solid-state storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via a computer network) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/solid-state storage device 102 may appear as a storage device connected through a SCSI bus, Internet SCSI ("iSCSI"), fiber channel, etc. Meanwhile the storage device/solid-state storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/solid-state storage device 102 to be partitioned into multiple virtual devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 202, or more specifically in a solid-state storage device 102.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 102 and one or more external memory controllers 250 and associated external memory arrays 252 and CPUs 248. Note that the external memory controllers 250 and external memory arrays 252 are called external because they are external to the storage device/solid-state storage device 102. In addition the DMA controller 226 may also control RDMA operations with requesting devices through a NIC 244 and associated RDMA controller 246.

In one embodiment, the solid-state storage device controller 202 includes a management controller 234 connected to a management bus 236. Typically the management controller 234 manages environmental metrics and status of the storage device/solid-state storage device 102. The management controller 234 may monitor device temperature, fan speed, power supply settings, etc. over the management bus 236.

The management controller 234 may support the reading and programming of erasable programmable read only memory ("EEPROM") for storage of FPGA code and controller software. Typically the management bus 236 is connected to the various components within the storage device/solid-state storage device 102. The management controller 234 may communicate alerts, interrupts, etc. over the local bus 206 or may include a separate connection to a system bus 240 or other bus. In one embodiment the management bus 236 is an Inter-Integrated Circuit ("I2C") bus. One of skill in the art will recognize other related functions and uses of a management controller 234 connected to components of the storage device/solid-state storage device 102 by a management bus 236.

In one embodiment, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Data Pipeline

Figure 3:
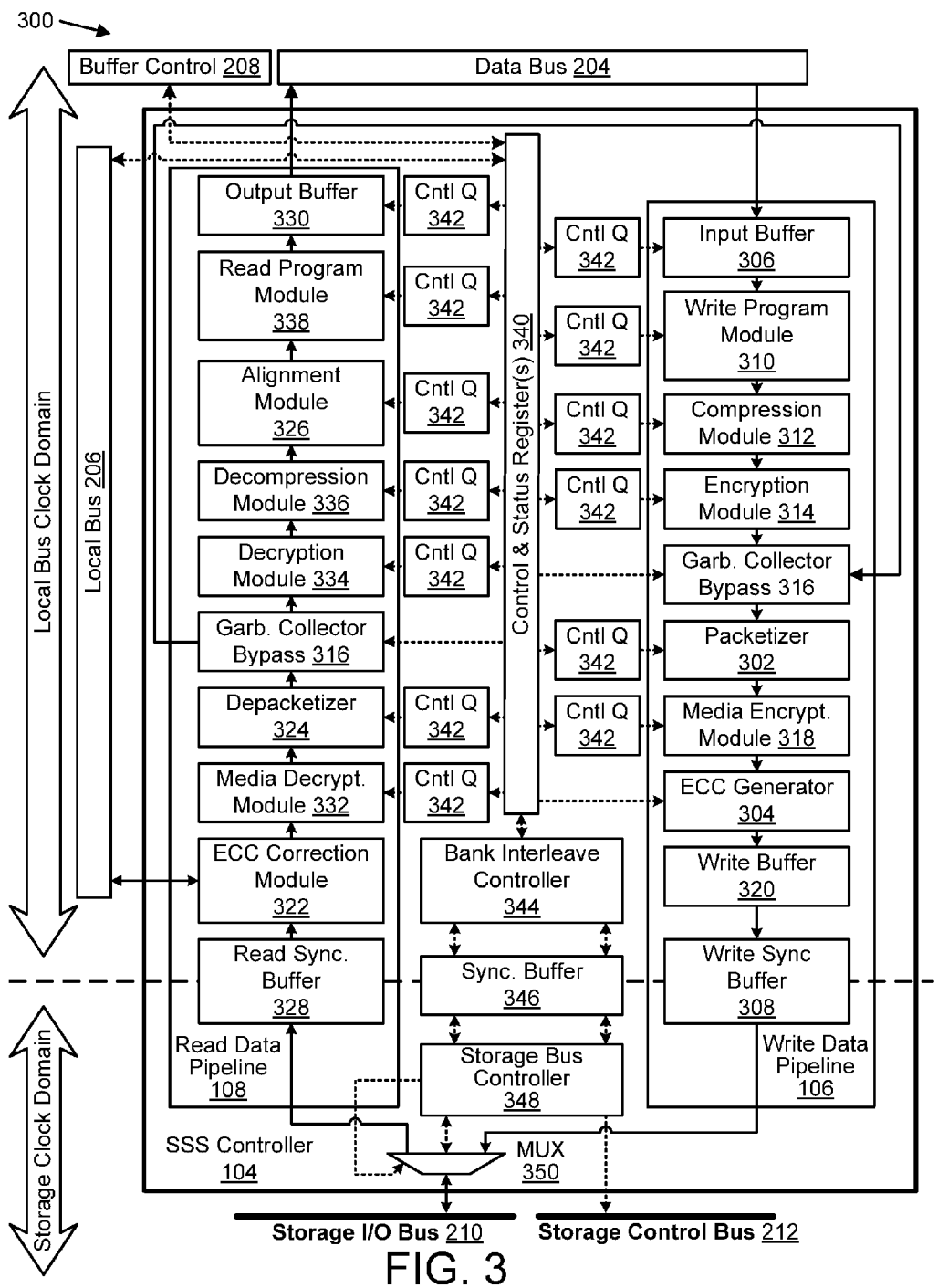
FIG. 3 is a schematic block diagram illustrating one embodiment of a solid-state storage controller with a write data pipeline and a read data pipeline in a solid-state storage device in accordance with the present invention.

FIG. 3 depicts one embodiment 300 of a solid-state storage controller 104 with a write data pipeline 106 and a read data pipeline 108 in a solid-state storage device 102. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer device 112 or other host device, or other computer or device and is transmitted to the solid-state storage device 102 in data segments streamed to the solid-state storage device 102 and/or the computer device 112. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the solid-state storage device 102, the solid-state storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 102 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the solid-state storage device 102, but outside the write data pipeline 106, in the computer device 112, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage media 110. The write synch buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the solid-state storage device 102 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, solid-state storage device 102, or server, the contents of the solid-state storage media 110 typically could not be read without use of the same encryption key used during the write of the data to the solid-state storage media 110 without significant effort.

In a typical embodiment, the solid-state storage device 102 does not store the encryption key in non-volatile storage and allows no external access to the encryption key. The encryption key is provided to the solid-state storage controller 104 during initialization. The solid-state storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a computer device 112, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the solid-state storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-state storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a computer device 112, key manager, or other device that holds the encryption key to be used to encrypt the data segment. In one embodiment, encryption keys are transferred to the solid-state storage controller 104 from one of a solid-state storage device 102, a computer device 112, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the solid-state storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the solid-state storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific solid-state storage device 102 if the solid-state storage media 110 is connected to a different solid-state storage controller 104, solid-state storage device 102, or computer device 112, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 102 is beneficial so that the computer device 112 or other devices writing data to the solid-state storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the solid-state storage device 102. This allows the solid-state storage device 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by a computer device 112 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the virtual page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full virtual page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO")

register with a capacity of more than a virtual page of data segments. One of skill in the art will recognize other write buffer 320 configurations that allow a virtual page of data to be stored prior to writing the data to the solid-state storage media 110.

In another embodiment, the write buffer 320 is sized smaller than a virtual page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a virtual page prior to programming the data. In this way a data stall in the write data pipeline 106 would not stall reading from the solid-state storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the solid-state storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the solid-state storage device 102 prior to sending the one or more requested packets to the depacketizer 324. Typically the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a computer device 112, a computer, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
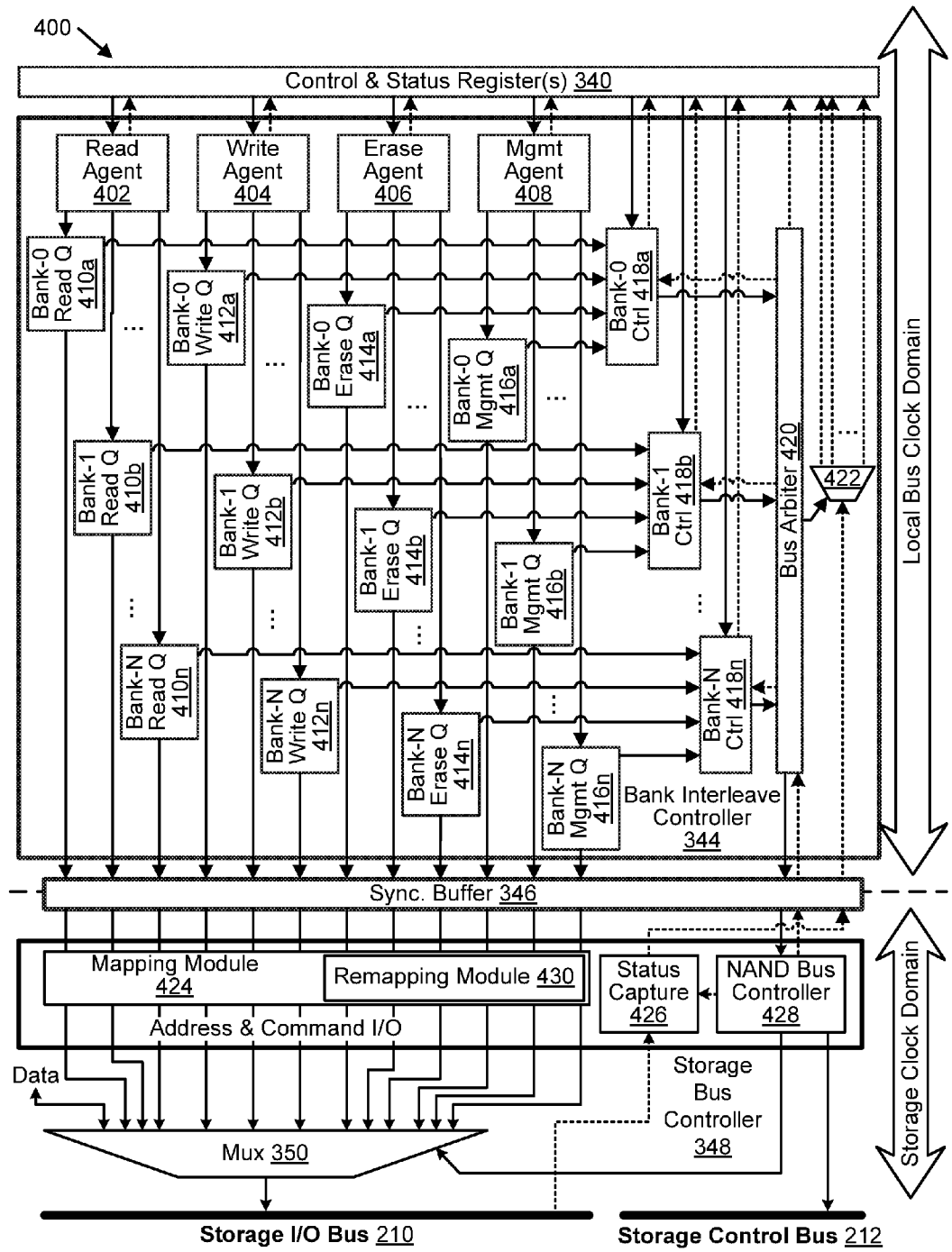
FIG. 4 is a schematic block diagram illustrating one embodiment of a bank interleave controller in a solid-state storage controller in accordance with the present invention.

The solid-state storage controller 104 and or the solid-state storage device 102 may also include a bank interleave controller 344, a synchronization buffer 346, a storage bus controller 348, and a multiplexer ("MUX") 350, which are described in relation to FIG. 4.

Bank Interleave

FIG. 4 depicts one embodiment 400 of a bank interleave controller 344 in the solid-state storage controller 104. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage media 110 execution of the commands stored in the queues, such that a command of a first type executes on one bank 214a while a command of a second type executes on a second bank 214b. The one or more commands are separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, SONOS, RRAM, PMC, CBRAM, racetrack memory, memristor memory, nanocrystal wire-based memory, silicon-oxide based sub-10 nanometer process memory, graphene memory, etc.

For other types of solid-state storage media 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage media 110, a write queue 412 for write commands to the solid-state storage media 110, an erase queue 414 for erasing an erase block in the solid-state storage, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management commands, status requests, and the like, such as a reset command or a request to read a configuration register of a bank 214, such as bank-0 214a. The management agent 408 sends the management command to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418a which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a.

The storage bus controller 348 then transmits a write subcommand on the storage I/O bus 210, which contains the physical addresses including the address of the logical erase block for each individual physical erase solid-stage storage element 216a-m as mapped from the logical erase block address. The storage bus controller 348 then muxes the write buffer 320 through the write sync buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While bank-0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216a-m, 218a-m, 220a-m. For example, one bank interleave controller 344 serves one column of storage elements SSS 0.0-SSS M.0 216a, 216b, . . . 216m, a second bank interleave controller 344 serves a second column of storage elements SSS 0.1-SSS M.1 218a, 218b, . . . 218m etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the solid-state storage device 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage array 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each column of solid-state storage elements (e.g. SSS 0.0 216a, SSS 1.0 218a, SSS N.0 220a). A MUX 350 combines data from the write data pipeline 106 and commands sent to the solid-state storage 110 via the storage I/O bus 210 and separates data to be processed by the read data pipeline 108 from commands. Packets stored in the write buffer 320 are directed on busses out of the write buffer 320 through a write synchronization buffer 308 for each column of solid-state storage elements (SSS 0.x to SSS N.x 216, 218, 220) to the MUX 350 for each column of solid-state storage elements (SSS 0.x to SSS N.x 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage 110 with an array of twenty storage elements (e.g. SSS 0.0 to SSS 0.M 216) per bank 214a may have a logical address for a particular erase block mapped to twenty physical addresses of the erase block, one physical address per storage element. Because the storage elements are accessed in parallel, erase blocks at the same position in each storage element in a column of storage elements 216a, 218a, 220a will share a physical address. To select one erase block (e.g. in storage element SSS 0.0 216a) instead of all erase blocks in the column (e.g. in storage elements SSS 0.0, 1.0, . . . N.0 216a, 218a, 220a), one bank (in this case Bank 0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 0.1 216b, . . . , and to storage element 0.M 216m, virtual erase block 2 may be mapped to erase block 2 of storage element SSS 1.0 218a, to erase block 2 of storage element SSS 1.1 218b, . . . , and to storage element 1.M 218m, etc. Alternatively, virtual erase block 1 may be mapped to one erase block from each storage element in an array such that virtual erase block 1 includes erase block 1 of storage element SSS 0.0 216a to erase block 1 of storage element SSS 0.1 216b to storage element 0.M 216m, and erase block 1 of storage element SSS 1.0 218a to erase block 1 of storage element SSS 1.1 218b, . . . , and to storage element 1.M 218m, for each storage element in the array up to erase block 1 of storage element N.M 220m.

If erase block 1 of a storage element SSS0.0 216a is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216a is available and currently not mapped, the remapping module 430 could change the mapping of virtual erase block 1 to point to erase block 221 of storage element SSS 0.0 216a, while continuing to point to erase block 1 of storage element SSS 0.1 216b, erase block 1 of storage element SSS 0.2 (not shown) . . . , and to storage element 0.M 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage 110 and sends the status messages to the status MUX 422. In another embodiment, when the solid-state storage 110 is flash memory, the storage bus controller 348 includes a NAND bus controller 428. The NAND bus controller 428 directs commands from the read and write data pipelines 106, 108 to the correct location in the solid-state storage 110, coordinates timing of command execution based on characteristics of the flash memory, etc. If the solid-state storage 110 is another solid-state storage type, the NAND bus controller 428 would be replaced by a bus controller specific to the storage type. One of skill in the art will recognize other functions of a NAND bus controller 428.

Persistent Object Store

Figure 5:
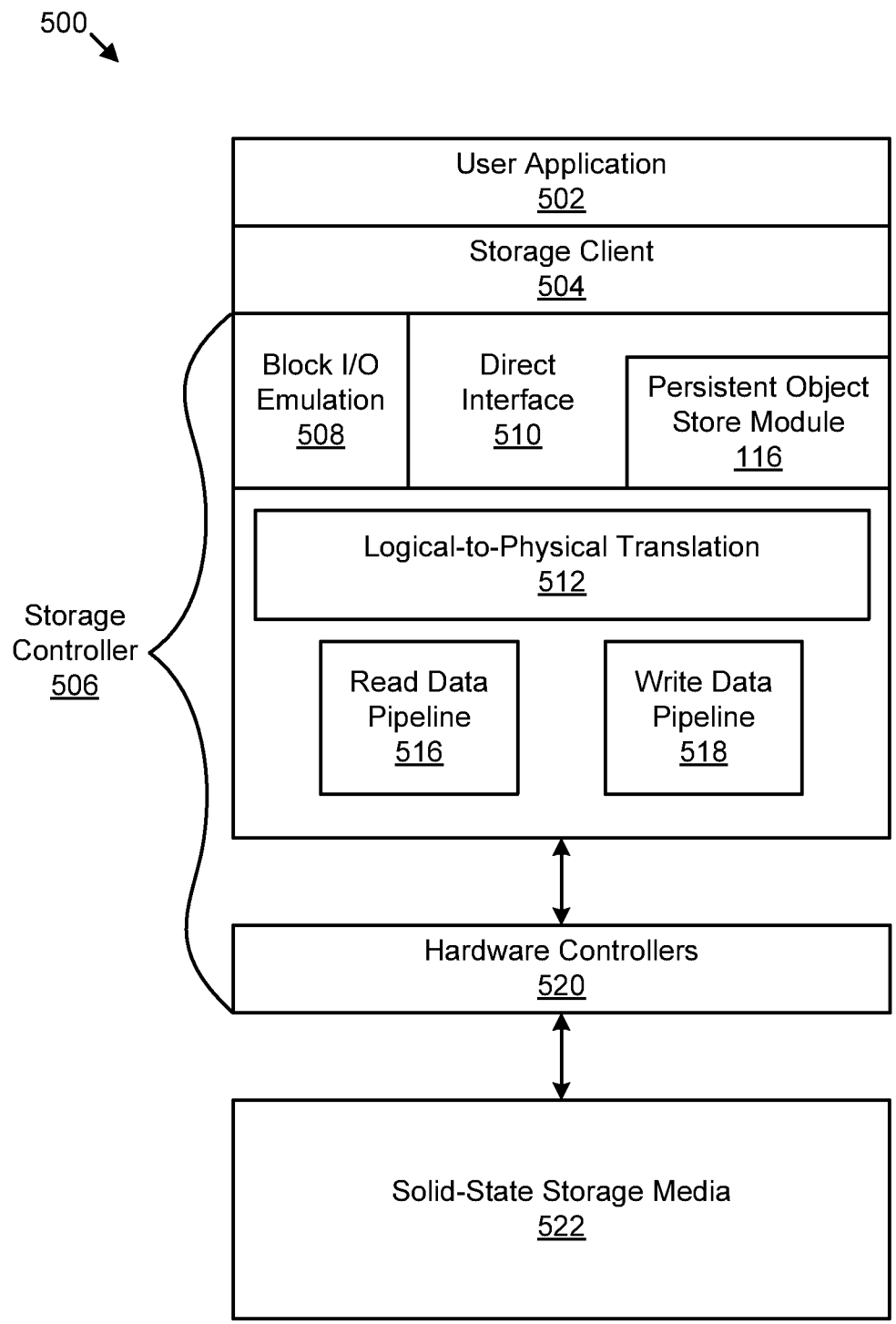
FIG. 5 is a schematic block diagram illustrating one embodiment of a logical representation of a solid-state storage controller in accordance with the present invention.

FIG. 5 depicts one embodiment of a logical representation 500 of a solid-state storage controller 506 with a persistent object store module 116. The storage controller 506 may be similar, in certain embodiments, to the solid-state storage controller 104 depicted in FIG. 1 and FIG. 2 and may include one or more solid-state storage controllers 104. The depicted embodiment shows a user application 502 in communication with a storage client 504. The storage client 504 is in communication with a storage controller 506 that includes a logical-to-physical translation layer 512, a read data pipeline 516, and a write data pipeline 518.

The storage controller 506 manages the solid-state storage media 522. The storage controller 506 may include various hardware and software controllers, drivers, and software, such as the depicted hardware controllers 520.

In one embodiment, the depicted hardware controllers 520 may be substantially similar to and include similar functionality as the solid-state controllers 104 and accompanying controllers and modules depicted in FIG. 2 and/or the bank interleave controller 344 and storage bus controller 348 depicted in FIG. 3. In addition, the read data pipeline 516 and the write data pipeline 518 may be substantially similar to the read data pipeline 108 and the write data pipeline 106 depicted in FIG. 1 and FIG. 3. The solid-state storage media 522 be substantially similar to the solid-state storage media 110 and associated array of solid-state storage banks 214 depicted in FIG. 2.

In one embodiment, the user application 502 is a software application, device driver, or other client 114 operating on or in conjunction with the storage client 504. The storage client 504 manages files and data and utilizes the functions and features of the storage controller 506 and associated solid-state storage media 522. Representative examples of storage clients 504 include, but are not limited to, a server, a file system, an operating system, a database management system ("DBMS"), a volume manager, and the like. The storage client 504 is in communication with the storage controller 506. In one embodiment, the storage client 504 communicates through an Input/Output (I/O) interface represented by a block I/O emulation layer 508 and/or the direct interface 506.

Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is managed by the storage manager. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

However, certain storage devices 102 do not directly or necessarily associate logical block addresses with particular physical blocks. These storage devices 102 may emulate a conventional block storage interface to maintain compatibility with block storage clients 504.

When the storage client 504 communicates through the block I/O emulation layer 508, the solid-state storage device 102 appears to the storage client 504 as a conventional block storage device. In one embodiment, the storage controller 506 provides a block I/O emulation layer 508 which serves as a block device interface, or API. In this embodiment, the storage client 504 communicates with the solid-state storage device 102 through this block device interface. In one embodiment, the block I/O emulation layer 508 receives commands and logical block addresses from the storage client 504 in accordance with this block device interface. As a result, the block I/O emulation layer 508 provides the solid-state storage device 102 compatibility with block storage clients 504.

In one embodiment, a storage client 504 communicates with the storage controller 506 through a direct interface layer 510. In this embodiment, the solid-state storage device 102 directly exchanges information in a format specific to non-volatile storage devices. A solid-state storage device 102 supporting a direct interface 510 may store data on the solid-state storage media 522 as blocks, sectors, pages, logical blocks, logical pages, erase blocks, logical erase blocks, ECC chunks, logical ECC chunks, data objects, or in any other format or structure advantageous to the technical characteristics of the solid-state storage media 522. The storage controller 506 receives a logical address and a command from the storage client 504 and performs the corresponding operation in relation to the non-volatile solid-state storage media 522. The storage controller 506 may support a block I/O emulation layer 508, a direct interface 510, or both a block I/O emulation layer 508 and a direct interface 510.

In the depicted embodiment, clients 114, such as user applications 502 and/or storage clients 504, communicate with the persistent object store module 116 using a direct interface 510. The persistent object store module 116 makes data objects available to clients 114 over the direct interface 510. Clients 114 send object store commands, such as create object store commands, read commands, write commands, delete commands, enumerate commands, export commands, client identifier mapping commands, and the like, directly to the persistent object store module 116 to access and manipulate data objects. In one embodiment, the direct interface 510 presents an API or other interface for the persistent object store module 116 to clients 114 as part of a device driver for the solid-state storage device 102.

The object store API or other object store interface of the persistent object store module 116 may support several commands, requests, function calls, or the like. In one embodiment, the object store API or other object store interface supports a create object store command that initializes or creates a new object store for a requesting client 114. Another object store API command is a read request, discussed in greater detail below with regard to the read module 606 of FIGS. 6 and 7. A client 114 issues a read request with a key value, and the persistent object store module 116 responds by returning the data object corresponding to the key value. A write request object store API command is described below with regard to the write module 702 of FIG. 7. A client 114 issues a write request to the persistent object store module 116 with a data object to add to an object store. In one embodiment, a client 114 manages its own key values, and sends a key value to the persistent object store module 116 with a write request. In another embodiment, the persistent object store module 116 may manage and assign key values, and may generate a key value for a data object in response to receiving a write request, sending the generated key value back to the requesting client 114.

An additional object store API command is a delete request. Delete requests are described in greater detail below with regard to the delete module 704 of FIG. 7. A client 114 sends a delete request to the persistent object store module 116 with a key value, and the persistent object store module 116 deletes the data object corresponding to the key value. Another object store API command is an enumerate request, described below with regard to the enumerate module 706 of FIG. 7. A client 114 sends an enumerate request to the persistent object store module 116 and the persistent object store module 116 returns a listing of a set of key values corresponding to objects stored in the object store, by client identifier, section identifier, or the like. An export request is another type of object store API command described below with regard to the export module 708 of FIG. 7. A client 114 sends an export request to the persistent object store module 116 and the persistent object store module 116 exports an object store, a portion of an object store, or the like to the requesting client 114.

Another embodiment of an object store API command is a client identifier mapping request as described below with regard to the identifier mapping module 712 of FIG. 7. A client 114 sends a universal client identifier to the persistent object store module 116 and the persistent object store module 116 maps the universal client identifier to an object store client identifier, which the persistent object store module 116 returns to the requesting client 114. One of skill in the art, in light of this disclosure, will recognize other object store API commands that the persistent object store module 116 may support to facilitate the manipulation and administration of data objects and object stores.

The persistent object store module 116, in certain embodiments, makes data objects and object store commands available to clients 114 exclusively through an object store interface, such as the direct interface 510, such that data objects are unavailable using a block device interface, such as the block I/O emulation layer 508. For example, the persistent object store module 116 may store data defining an object store, data objects, or the like in a restricted set of logical block addresses ("LBAs"), to which the block I/O emulation layer 508 denies access. In one embodiment, if a client 114, such as a user application 502 or a storage client 504, sends a storage request for a restricted LBA to the block I/O emulation layer 508, the block I/O emulation layer 508 may ignore the storage request, reject the storage request, throw an out of range error, or the like to prevent access to the restricted set of LBAs. In this manner, data objects stored in the restricted set of LBAs may be available to clients 114 exclusively using an object store interface, such as the direct interface 510.

As described above, certain storage devices, while appearing to a storage client 504 to be a block storage device, do not directly associate particular logical block addresses with particular physical blocks, also referred to in the art as sectors. Such storage devices may use a logical-to-physical translation layer 512. The logical-to-physical translation layer 512 provides a level of abstraction between the logical block addresses used by the storage client 504, and the physical block addresses at which the storage controller 506 stores the data. The logical-to-physical translation layer 512 maps logical block addresses to physical block addresses of data stored on solid-state storage media 522. This mapping allows data to be referenced in a logical address space using logical identifiers, such as a logical block address. A logical identifier does not indicate the physical location of data on the solid-state storage media 522, but is an abstract reference to the data.

The storage controller 506 manages the physical block addresses in the physical address space. In one example, contiguous logical block addresses may in fact be stored in non-contiguous physical block addresses as the logical-to-physical translation layer 512 determines the location on the solid-state storage media 522 to perform data operations.

Furthermore, in one embodiment, the logical address space is substantially larger than the physical address space. This "thinly provisioned" or "sparse address space" embodiment, allows the number of logical identifiers for data references to greatly exceed the number of possible physical addresses.

In one embodiment, the logical-to-physical translation layer 512 includes a map or index that maps logical block addresses to physical block addresses. The map may be in the form of a B-tree, a content addressable memory ("CAM"), a binary tree, and/or a hash table, and the like. In certain embodiments, the logical-to-physical translation layer 512 is a tree with nodes that represent logical block addresses and comprise corresponding physical block addresses.

As stated above, in conventional block storage devices, a logical block address maps directly to a particular physical block. When a storage client 504 communicating with the conventional block storage device deletes data for a particular logical block address, the storage client 504 may note that the particular logical block address is deleted and can re-use the physical block associated with that deleted logical block address without the need to perform any other action.

Conversely, when a storage client 504, communicating with a storage controller 104 with a logical-to-physical translation layer 512 (a storage controller 104 that does not map a logical block address directly to a particular physical block), deletes a logical block address, the corresponding physical block address remains allocated because the storage client 504 does not communicate the change in used blocks to the storage controller 506. The storage client 504 may not be configured to communicate changes in used blocks (also referred to herein as "data block usage information"). Because the storage client 504 uses the block I/O emulation 508 layer, the storage client 504 may erroneously believe that the storage controller 506 is a conventional storage controller that would not utilize the data block usage information. Or, in certain embodiments, other software layers between the storage client 504 and the storage controller 506 may fail to pass on data block usage information.

Consequently, the storage controller 104 preserves the relationship between the logical block address and a physical address and the data on the solid-state storage device 102 corresponding to the physical block. As the number of allocated blocks increases, the performance of the storage controller 104 may suffer depending on the configuration of the storage controller 104.

Specifically, in certain embodiments, the storage controller 506 is configured to store data sequentially, using an append-only writing process, and use a storage space recovery process that re-uses non-volatile storage media storing deallocated/unused logical blocks. Specifically, as described above, the storage controller 506 may sequentially write data on the solid-state storage media 522 in a log structured format and within one or more physical structures of the storage elements, the data is sequentially stored on the solid-state storage media 522.

As a result of storing data sequentially and using an append-only writing process, the storage controller 506 achieves a high write throughput and a high number of I/O operations per second ("IOPS"). The storage controller 506 includes a storage space recovery, or garbage collection process that re-uses data storage cells to provide sufficient storage capacity. The storage space recovery process reuses storage cells for logical blocks marked as deallocated, invalid, unused, or otherwise designated as available for storage space recovery in the logical-physical translation layer 512.

As described above, the storage space recovery process determines that a particular section of storage may be recovered. Once a section of storage has been marked for recovery, the storage controller 506 may relocate valid blocks in the section. The storage space recovery process, when relocating valid blocks, copies the packets and writes them to another location so that the particular section of storage may be reused as available storage space, typically after an erase operation on the particular section. The storage controller 506 may then use the available storage space to continue sequentially writing data in an append-only fashion. Consequently, the storage controller 104 expends resources and overhead in preserving data in valid blocks. Therefore, physical blocks corresponding to deleted logical blocks may be unnecessarily preserved by the storage controller 104, which expends unnecessary resources in relocating the physical blocks during storage space recovery.

Some storage devices 102 are configured to receive messages or commands notifying the solid-state storage device 102 of these unused logical blocks so that the solid-state storage device 102 may deallocate the corresponding physical blocks. As used herein, to deallocate a physical block includes marking the physical block as invalid, unused, or otherwise designating the physical block as available for storage space recovery, its contents on storage media no longer needing to be preserved by the storage controller 506. Data block usage information, in reference to the storage controller 506, may also refer to information maintained by the storage controller 506 regarding which physical blocks are allocated and/or deallocated/unallocated and changes in the allocation of physical blocks and/or logical-to-physical block mapping information. Data block usage information, in reference to the storage controller 506, may also refer to information maintained by the storage controller 506 regarding which blocks are in use and which blocks are not in use by a storage client. Use of a block may include storing of data in the block on behalf of the client, reserving the block for use by a client, and the like.

While physical blocks may be deallocated, in certain embodiments, the storage controller 506 may not immediately erase the data on the storage media. An erase operation may be performed later in time. In certain embodiments, the data in a deallocated physical block may be marked as unavailable by the storage controller 506 such that subsequent requests for data in the physical block return a null result or an empty set of data.

One example of a command or message for such deallocation is the "Trim" function of the "Data Set Management" command under the T13 technical committee command set specification maintained by INCITS. A storage device, upon receiving a Trim command, may deallocate physical blocks for logical blocks whose data is no longer needed by the storage client 504. A storage controller 506 that deallocates physical blocks may achieve better performance and increased storage space, especially storage controllers 506 that write data using certain processes and/or use a similar data storage recovery process as that described above.

Consequently, the performance of the storage controller 506 is enhanced as physical blocks are deallocated when they are no longer needed such as through the Trim command or other similar deallocation commands issued to the storage controller 506.

Figure 6:
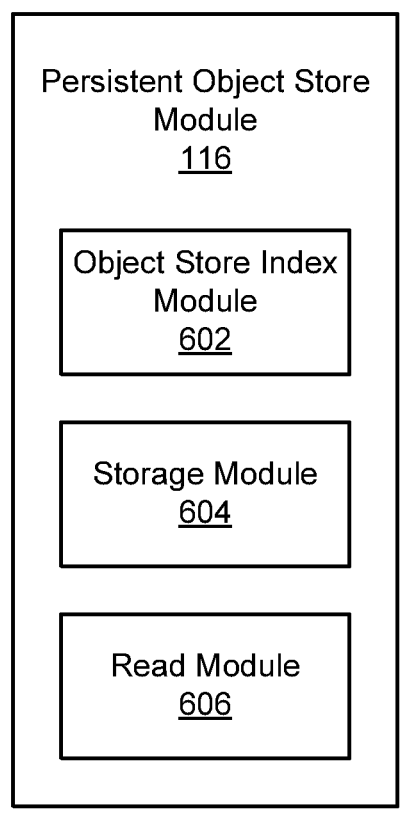
FIG. 6 is a schematic block diagram illustrating one embodiment of a persistent object store module in accordance with the present invention.

FIG. 6 depicts one embodiment of a persistent object store module 116. In certain embodiments, the persistent object store module 116 may be substantially similar to the persistent object store modules 116 described above with regard to FIGS. 1 and 5. The persistent object store module 116, in the depicted embodiment, includes an object store index module 602, a storage module 604, and a read module 606.

In one embodiment, the object store index module 602 maintains an object store that associates data objects with unique key values. The object store indexes or maps key values to data objects so that a client 114 can access the data objects using the key values. The object store index module 602, in certain embodiments, maintains an object store index as a dictionary that associates key values with data objects. An object store index is a data structure, such as a look up table ("LUT"), a B-tree, a CAM, a binary tree, a hash table, an array, a linked list, a heap, or the like, that maps key values to data objects. One embodiment of an object store index 802 is described in greater detail below with regard to FIG. 8.

The object store index module 602, in one embodiment, maintains a single object store index with object store data for one or more clients 114 of a solid-state data storage device 102. In another embodiment, the object store index module 603 may maintain multiple object store indexes, an object store index for each client 114, an object store index for each separate object store, or the like. Characteristics of a key value, in certain embodiments, may depend on the granularity of object store indexes that the object store index module 602 maintains.

In one embodiment, the object store index module 602 dynamically updates the object store, the object store index, or the like, as clients 114 add or remove data objects from the object store. Interfaces for adding and removing data objects are described below with regard to the write module 702 and the delete module 704. The object store, in other embodiments, may be substantially static, and pre-populated with data objects and associated key values, by a manufacturer, vendor, administrator, or the like.

The object store index module 602, in one embodiment, stores key values and the associated data objects together in the object store index. In another embodiment, the object store index module 602 stores data objects at an LBA of the solid-state storage device 102. In embodiments where a data object itself is not stored in the object store index, the object store index may store key values and links or pointers to the associated data objects, such as LBAs or the like. In a further embodiment, the object store index module 602 stores a data object in the object store index if the data object satisfies a size threshold, and stores a data object at an LBA of the solid-state storage device 102 if the size of the data object is greater than the size threshold. A data object satisfies the size threshold, in one embodiment, if the data object is less than or equal to the size threshold. In other embodiments, a data object may satisfy the size threshold if the data object has another predefined relationship to the size threshold. Storing a data object that satisfies a size threshold in the object store index, in certain embodiments, is a more efficient use of storage capacity than storing a small data object in its own data block at its own LBA, because several small data objects can be stored in the same data block at the same LBA.

In one embodiment, the object store index module 602 maintains the object store index in volatile memory or RAM, such as volatile memory of the computer device 112 and/or volatile memory of the solid-state storage device 102. As described below with regard to the storage module 604, in certain embodiments, the storage module 604 persists the object store index and/or other data of the object store to one or more LBAs of the solid-state storage device 102.

For new data objects, in one embodiment, the object store index module 602 determines, generates, or otherwise assigns a key value for the new data object. In another embodiment, the object store index module 602 receives a key value for a new data object from a requesting client 114 with a write request for the new data object, and clients 114 manage key values themselves. A key value may comprise a binary or hexadecimal value, a string, an integer, or another data type that may have different unique values.

In certain embodiments, a key value for a data object is a combination of several sub-values, such as a client identifier, a section identifier, a key identifier, or the like. A client identifier identifies or is otherwise associated with a requesting client 114. In one embodiment, clients 114 of the same type share a client identifier. By sharing the same client identifier, clients 114 of the same type, in certain embodiments, may access the same data objects in the object store. Sharing data objects may allow clients 114 to maintain consistent settings or to otherwise coordinate or synchronize data. For example, if a data solid-state storage device 102 is installed in or otherwise paired with a first computer device 112, a device driver or other client 114 may access data objects, store data objects, and the like, and when the data solid-state storage device 102 is installed in or otherwise paired with a second computer device 112, a client 114 of the same client type may access the same data objects, such as license information, settings, cache binding information, software, recovery information, or the like. In other embodiments, a client identifier may be unique, even among clients 114 of the same type, so that the clients 114 may maintain separate data objects, without interference from other clients 114. Alternatively, clients 114 of the same type may share a client identifier, but may use unique section identifiers for private data objects that are not shared between clients 114, even of the same type.

A section identifier identifies or is otherwise associated with a group of data objects that have a common characteristic. Section identifiers provide organization for data objects, allowing the object store index module 602 and/or clients 114 to classify, manage, or otherwise organize data objects in the object store. For example, a client 114 may use one section identifier for startup configuration settings and another section identifier for runtime configuration settings, or the like. In one embodiment, a client 114 may assign and manage section identifiers for data objects associated with the client 114. In another embodiment, the object store index module 602 assigns and manages section identifiers for clients 114.

A key identifier identifies an associated data object, differentiating between data objects with the same client identifier and section identifier. The object store index module 602 may assign and manage key identifiers and/or a client 114 may assign and manage key identifiers. Key identifiers may be assigned sequentially, or in another manner to ensure uniqueness. Key values are unique for an object store; and key identifiers are unique for a given client identifier and section identifier to ensure that the key values remain unique. The size of a key value and any sub-values such as client identifiers, section identifiers, and key identifiers, may be selected based on a number of anticipated data objects, a number of anticipated clients 114, a number of anticipated sections per client 114, a number of anticipated data objects per section, or the like.

In certain embodiments, a key value for a data object may be a known value that is predefined for several clients 114, so that each of the clients 114 may access the data object. In another embodiment, as described below with regard to the enumerate module 706, the persistent object store module 116 may list key values for a client 114.

In one embodiment, the solid-state storage device 102 is a cache device, and a client 114, such as a cache device driver or the like, stores cache binding information in the object store as a data object. Cache binding information may include link information between a cache storage device 102 and a backing store, cache operational parameters, cache modes, a path or other identifier of a backing store, or the like.

In another embodiment, a data object may include configuration information or settings for the solid-state storage device 102. Configuration information may include startup configuration information relating to a startup process for the solid-state storage device 102, runtime configuration information relating to operation of the solid-state storage device 102, recovery information relating to recovery from an error such as an improper shutdown, or the like.

In certain embodiments, the solid-state storage device 102 and/or a device driver client 114 for the solid-state storage device 102 periodically stores or checkpoints configuration information as a data object. One embodiment of configuration information that may be checkpointed as a data object is data map information, such as a validity map, a clean/dirty map, or the like. A validity map indicates which data on the solid-state storage device 102 is valid and which data has been invalidated by subsequent writes. A clean/dirty map for a cache storage device 102 indicates which data has been destaged to a backing store. Another embodiment of configuration information that may be checkpointed is a logical to physical mapping structure, described above with regard to the logical-to-physical translation layer 512 and described below with regard to the mapping structure 1000 of FIG. 10.

In one embodiment, a data object may include license information for the solid-state storage device 102. License information for the solid-state storage device 102 may indicate certain features, permissions, utilities, functions, or the like that a customer or user has been granted access to, so that such access or permissions remain consistent as the solid-state storage device 102 is used with different computer devices 102, by different clients 114, or the like. A device driver client 114 may access a license information data object to determine which features or permissions to grant for the solid-state storage device 102.

In a further embodiment, a data object may comprise device driver software for the solid-state storage device 102. A client 114 may retrieve the device driver software from the object store and install and/or execute the device driver software on the computer device 112. Storing device driver software for the solid-state storage device 102 or for another device as a data object provides the device driver software to a client 114 without a separate download process, separate data storage media, or the like.

In one embodiment, the storage module 604 persists object store data to one or more LBAs of the solid-state storage device 102. The object store data that the storage module 604 persists, in certain embodiments, defines the object store. One example of object store data that defines an object store is the object store index described above with regard to the object store index module 602. Other embodiments of object store data may include one or more of data objects, object store metadata, an object store transaction log, and/or other data defining an object store. The storage module 604, in one embodiment, persists the object store data by copying the object store data that the object store index module 602 maintains from volatile memory to the solid-state storage media 110.

The storage module 604, in certain embodiments, persists the object store data to the solid-state storage media 110 in response to an update event or trigger. In one embodiment, an update event may include a change to the object store such as a client 114 adding, modifying, or removing a data object. In another embodiment, an update event may include a startup operation or shutdown operation for the solid-state storage device 102. Update events may be selected such that the object store, even if the object store index module 602 maintains the object store in volatile memory, is persisted in the nonvolatile solid-state storage media 110.

In one embodiment, the storage module 604 persists data of the object store to one or more LBAs of the solid-state storage device 102 that are members of a restricted set of LBAs. Data of the restricted set of LBAs is accessible to clients 114 through an object store interface of the persistent object store module 116, but is unavailable through a block device interface for the solid-state storage device 102. For example, in one embodiment, the solid-state storage device 102 has a sparse logical address space that is larger than a physically addressable capacity of the solid-state storage device 102. The sparse logical address space may include a first set of LBAs that is available to clients 114 over a block device interface. The first set of LBAs may correspond to a reported physical capacity of the solid-state storage device 102, that clients 114 may access using standard block device commands. The sparse logical address space may also include a second set of LBAs, the restricted set, that is unavailable to clients 114 through a block device interface. In one embodiment, the restricted set of LBAs is in a portion of the sparse logical address space that is greater than a maximum client addressable capacity of the solid-state storage device 102.

In certain embodiments, because the storage module 604 stores object store data in a restricted set of LBAs that are unavailable over a block device interface and/or available exclusively through an object store interface, the object store data may be substantially invisible to clients 114 or other entities accessing the solid-state storage device 102 using a block device interface. The object store data therefore persists through formatting of the solid-state storage device 102, installation of an operating system on the solid-state storage device 102, erasing of the solid-state storage device 102, or the like.

In one embodiment, the storage module 604 stores object store data at a known LBA within the restricted set of LBAs, such as the first LBA of the restricted set of LBAs or the like. In another embodiment, the storage module 604 stores object store data at a next available LBA within the restricted set of LBAs. In certain embodiments, the storage module 604 may store multiple copies of the object store data. For example, the storage module 604 may mirror the object store data for redundancy, or may alternate between two different LBAs with each update event, so that the two most recent versions of the object store are persisted. In a further embodiment, the storage module 604 alternates between storing the object store data at a known LBA and storing the object store data at a next available LBA, or the like.

The one or more LBAs at which the storage module 604 stores or persists the object store data, are mapped to a physical location of the object store data on the solid-state storage device 102. In one embodiment, the logical-to-physical translation layer 512 uses a single mapping structure to map LBAs for object store data to physical locations on the solid-state storage media 110, and to map LBAs for workload data to physical locations on the solid-state storage media 110.

The storage module 604, in one embodiment, intermingles object store data with workload data on the solid-state storage media 110. By separating the object store data from the workload data logically but intermingling them physically, the object store data receives the same data protection characteristics as the workload data. For example, as described above, the solid-state storage controller 104, the write data pipeline 106, and the read data pipeline 108 provide certain data protection characteristics for data, such as error correction, garbage collection or storage capacity recovery, power cut or power loss protection, or the like to protect the integrity of data on the solid-state storage media 110. These data protection characteristics are applied to data regardless of the LBA for the data, restricted or not, applying to workload data and object store data.

In one embodiment, the storage module 604 persists the object store data by inserting the object store data into a write path for the solid-state storage device 102, such as the write data pipeline 106, a write queue, a write buffer, or the like. In certain embodiments, the write path includes both the object store data and workload data so that the object store data receives the same data protection characteristics as the workload data, as described above. In another embodiment, the storage module 604 persists the object store data by writing the object store data to an append point of a sequential log-based writing structure persisted on the solid-state storage device 102. The sequential log-based writing structure, in certain embodiments, stores object store data and workload data intermingled in an order that the write data pipeline 106 or other write path receives the data. The sequential log-based writing structure, in a further embodiment, stores object store data and workload data using a mapping structure that associates LBAs with physical storage locations of the solid-state storage device 102. Embodiments of sequential log-based writing structures and mapping structures are described above with regard to the logical-to-physical mapping layer 512 and below with regard to FIG. 10.

The storage module 604, in certain embodiments, loads the persisted object store data, such as an object store index, from the solid-state storage device 102 into volatile memory for the object index module 602. The storage module 604 may load the object store data in response to a startup operation for the solid-state storage device 102, in response to an error condition for the object store index module 602, or the like. In one embodiment, the storage module 604 loads object store data from a known LBA. In another embodiment, the storage module 604 scans one or more LBAs, such as the restricted set of LBAs, to discover the object store data.

The read module 606 services object store read requests for clients 114. In one embodiment, the read module 606 provides a requested data object from the object store to a requesting client 114 in response to receiving a read request for the requested data object from the requesting client 114. A read request, in certain embodiments, includes a key value, and the read module 606 uses the key value to locate and retrieve the corresponding data object. The read module 606 may coordinate with the object store index module 602 to locate and retrieve a data object, may access the object store index directly, or the like. The read module 606 may retrieve a data object directly from an object store index, may retrieve a data object from an LBA for the data object listed in an object store index, or the like.

One example of a read request for the read module 606 is a direct memory access ("DMA") read request. A DMA read request, in one embodiment, includes a key value and a memory address. The read module 606 provides a data object associated with the key value to the requesting client 114 by writing the data object to the memory address of the DMA read request. In other embodiments, the read module 606 may provide a data object to a client 114 without a DMA transfer, sending the data object over a communications bus or the like.

Figure 7:
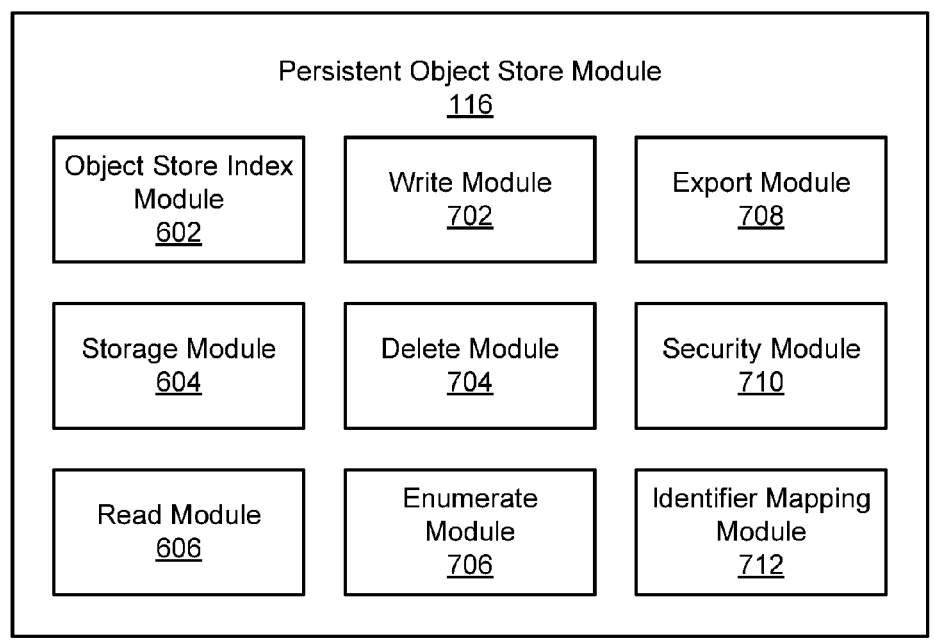
FIG. 7 is a schematic block diagram illustrating another embodiment of a persistent object store module in accordance with the present invention.

FIG. 7 depicts another embodiment of a persistent object store module 116. In certain embodiments, the persistent object store module 116 may be substantially similar to the persistent object store modules 116 described above with regard to FIGS. 1, 5, and 6. The persistent object store module 116, in the depicted embodiment, includes the object store index module 602, the storage module 604, and the read module 606 described above with regard to FIG. 6, and includes a write module 702, a delete module 704, an enumerate module 706, an export module 708, a security module 710, and an identifier mapping module 712

The write module 702 services data object write requests for clients 114. In one embodiment, in response to receiving a write request from a client 114, the write module 702 stores a received data object in the object store, adding the data object to the object store. The write module 702, in certain embodiments, may store the data object in volatile memory and the storage module 604 may persist the data object and other object store data in response to an update event. A write request, in one embodiment, includes a data object and a key value. In a further embodiment, a write request may include a data object without a key value, and the object store index module 602 may assign the data object a key value and return the key value to the requesting client 114.

In one embodiment, the write module 702 stores a received data object as an entry in an object store index in response to a size of the received data object satisfying a size threshold, as described above with regard to the storage module 604 of FIG. 6. The write module 702, in another embodiment, stores a received data object at an associated LBA of the solid-state storage device 102, such as a restricted LBA, in response to a size of the received data object being greater than the size threshold. Packing smaller data objects into an object store index where the data objects share LBAs and data blocks while storing larger data objects at their own LBA in their own data block, in certain embodiment, provides an efficient use of storage capacity and allows for variable sized data objects.

The delete module 704 services object store delete requests for clients 114. In one embodiment, the delete module 704 clears a data object from the object store and/or from the solid-state storage device 102 in response to receiving a delete request for the data object from a requesting client 114. A delete request, in certain embodiments, includes a key value associated with the data object to be deleted. The delete module 704 may delete, erase, trim, remove, overwrite, invalidate, or otherwise clear a data object from the object store. In certain embodiments, the delete module 704 may clear a key value or other metadata associated with a data object from the object store as well.

The enumerate module 706 services data object enumerate requests for clients 114. In one embodiment, the enumerate module 706 enumerates or lists key values to a client 114 in response to receiving an enumerate request from the client 114. An enumerate request, in certain embodiments, may have various scopes. In one embodiment, the enumerate module 706 may enumerate to a client 114 each key value associated with a client identifier. In another embodiment, the enumerate module 706 may enumerate to a client 114 each key value associated with a section identifier. A client 114, in one embodiment, may specify the scope of the enumerate request in the enumerate request.

The export module 708 services data object export requests for clients 114. In one embodiment, the export module 708 exports data objects and associated key values to a requesting client 114 in response to receiving an export request. The export module 708 may export just data objects and key values associated with the requesting client 114, may export data objects and key values associated with a section identifier, may export an entire object store, or may export data objects with a different granularity. In a further embodiment, the export module 708 is also configured to import data objects and associated key values into the object store, such as data objects exported from a different object store or the like. In this manner, the export module 708 may facilitate the transfer of object stores from one solid-state data storage device 102 to another, the backing up of an object store, or the like.

The security module 710 implements a security policy for the object store. In one embodiment, the security module 710 authenticates clients 114 and/or object store requests, providing security for the object store. The security module 710, in certain embodiments, authenticates each requesting client 114 by their client identifier, providing a requesting client 114 with access only to data objects and key values associated with the client identifier of the requesting client 114. The security module 710 may coordinate with the read module 606, the write module 702, the delete module 704, the enumerate module 706, and/or the export module 708 to ensure that object store requests are not serviced without client authentication.

In another embodiment, the security module 710 may encrypt and decrypt data objects, key values, and/or other object store data. In other embodiments, clients 114 may individually encrypt or otherwise secure data objects, if desired, prior to storing the data objects in the object store. In certain embodiments, a client 114 may set a security or authentication level for the data objects associated with the client 114. The security module 710, in a further embodiment, may implement a global security policy for data objects of the object store.

The identifier mapping module 712 generates client identifiers for clients 114. In one embodiment, clients 114 are each assigned a universal client identifier by a manufacturer, a vendor, an administrator, or the like. One example of a universal client identifier is a universally unique identifier ("UUID"), or the like. A UUID is a 128 bit number. In certain embodiments, to increase the efficiency of the object store, the identifier mapping module 712 maps a universal client identifier for a client 114, such as a UUID, to an object store client identifier for the client 114, using a known mapping. The known mapping may include a hash function, a truncation, a bit-masking, or another transformation that yields consistent, repeatable results. In embodiments where clients 114 of the same type have identical universal client identifiers, the identifier mapping module 712 maps the identical universal client identifiers to identical object store client identifiers. An object store client identifier, in one embodiment, is shorter than a universal client identifier. The size of object store client identifiers for a given object store may be selected based on an anticipated amount of clients 114 for the object store, or the like.

Key values, in certain embodiments, include an object store client identifier for the client 114 associated with the key value. In one embodiment, the identifier mapping module 712 maps a universal client identifier to an object store client identifier once for a client 114, and the client 114 retains the object store client identifier for use in subsequent object store requests. In another embodiment, clients 114 may use universal client identifiers for each object store request, and the identifier mapping module 712 may map the universal client identifier to an object store client identifier for each object store request.

Figure 8:
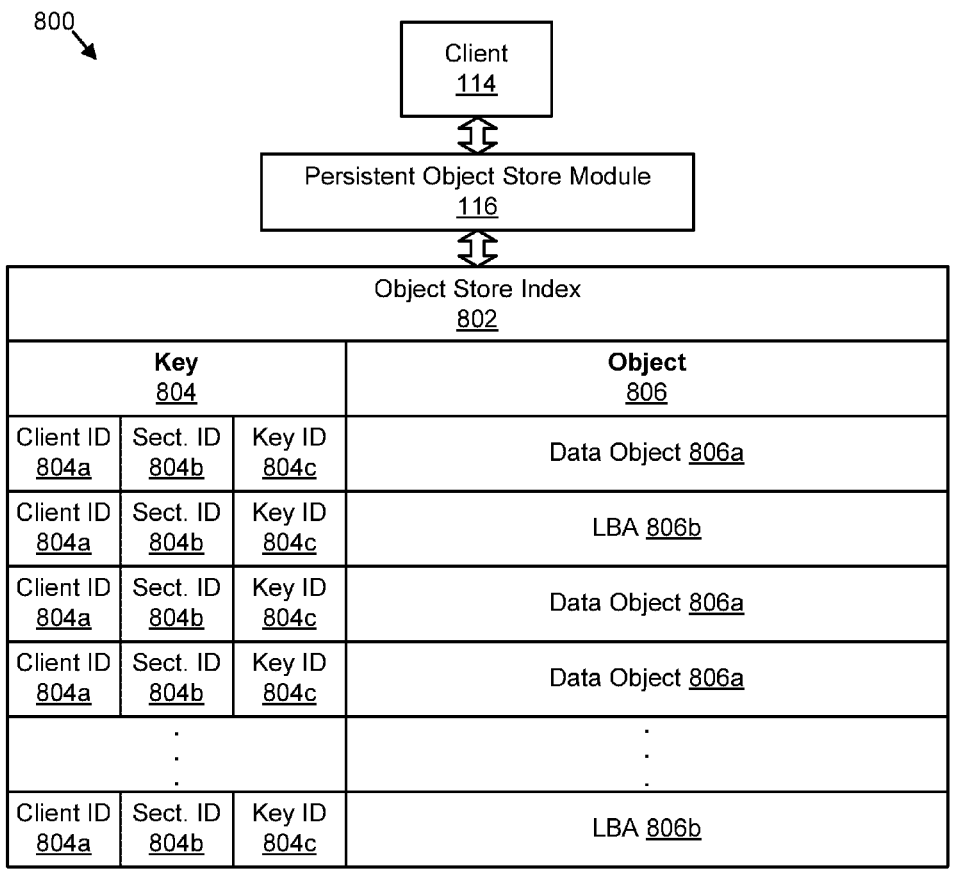
FIG. 8 is a schematic block diagram illustrating one embodiment of a system for persistently storing data objects in accordance with the present invention.

FIG. 8 depicts one embodiment of a system 800 for persistently storing data objects. The system 800, in the depicted embodiment, includes a client 114, a persistent object store module 116, and an object store index 802. The client 114 and the persistent object store module 116, in certain embodiments, are substantially similar to those described above with regard to FIGS. 1, 5, 6, and 7.

In the depicted embodiment, the client 114 accesses an object store defined by the object store index 802 through the persistent object store module 116. As described above, the persistent object store module 116 may include an object store index module 602 that maintains the object store index 802, a storage module 604 that persists the object store index 802, various other modules to support object store requests from the client 114, and the like. The object store index module 602 may maintain a working copy of the object store index 802 in volatile memory of the computer device 112 or of the solid-state storage device 102, and the storage module 604 may persist the object store index 802 on the solid-state storage media 110 of the solid-state storage device 102.

In the depicted embodiment, the object store index 802 associates key values 804 with data objects 806. Each key value 804, in the depicted embodiment, includes a client identifier 804*a*, a section identifier 804*b*, and a key identifier 804*c*. The client identifier 804*a* identifies the client 114 associated with the key value 804 and corresponding data object 806. The section identifier 804*b* allows the client 114 and/or the persistent object store module 116 to group data objects 806 by characteristic. The key identifier 804c ensures that key values 804 that share the same client identifier 804a and the same section identifier 804b are uniquely identifiable.

In the depicted embodiment, the object store index 802 represents a data object 806 as either a data object 806a itself, stored directly within an entry of the object store index 802, or as an LBA 806b that is mapped to a physical location of a data object 806 on the solid-state storage media 110. As described above, in certain embodiments, the object store index module 602 and/or the write module 702 determine whether to store the data object 806a itself or an LBA 806b for the data object 806 based on whether the data object 806 satisfies a size threshold. The size threshold may be selected such that at least a certain number of data objects 806 fit within a single data block associated with an LBA, such as 16 data objects 806, 32 data objects 806, or the like, to more efficiently use the solid-state storage media 110 and volatile memory where the object store index module 602 may maintain a working copy of the object store index 802. The LBA 806b that stores a data object 806, as described above, is logically a member of a restricted set of LBAs, but may be physically intermingled with workload data in a log-based writing structure of the solid-state storage device 102, or the like. Using LBAs, such as LBAs 806b, for data objects 806 that are within the restricted set of LBAs ensures the security and integrity of the corresponding data objects 806. Preferably, all LBAs for object store data (e.g. the object store index 802, data objects 806) are within the restricted set of LBAs.

The object store index 802, in the depicted embodiment, has a table format. In other embodiments, the object store index 802 may be embodied by another type of data structure, such as a B-tree, a CAM, a binary tree, a hash table, an array, a linked list, a heap, or the like.

Figure 9:
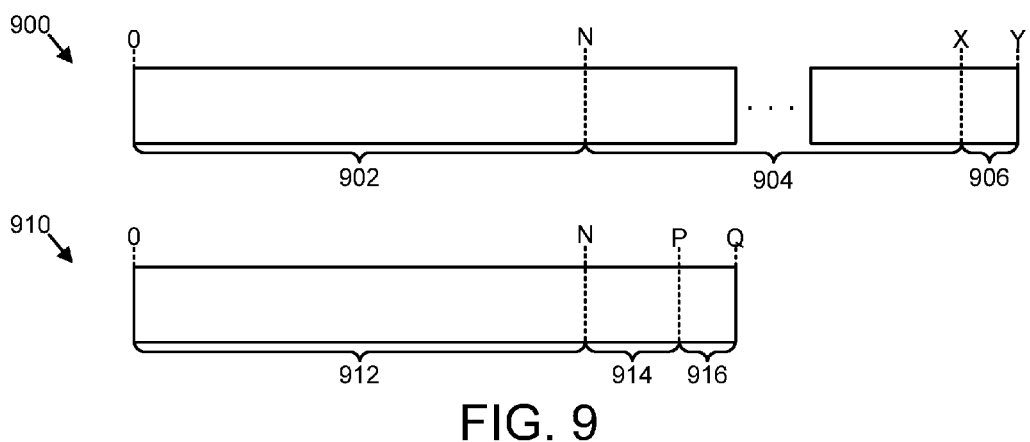
FIG. 9 is a schematic block diagram illustrating one embodiment of a logical address space and a physical storage capacity for a solid-state storage device in accordance with the present invention.

FIG. 9 depicts one embodiment of a logical address space 900 and a physical storage capacity 910 for a solid-state storage device 102. In the depicted embodiment, the logical address space 900 is a sparse address space that is larger than the physical storage capacity 910 of the solid-state storage device 102. A first set of LBAs 902 corresponds to a reported capacity 912 of the solid-state storage device 102. The reported capacity 912, in certain embodiments, is the capacity that is discoverable and useable by clients 114, operating systems, computer devices 112, and the like. The first set of LBAs 902 is available to clients 114 over a block device interface.

The reported capacity 912, in the depicted embodiment, is less than the total available physical storage capacity 910 of the solid-state storage device 102, as the solid-state storage device 102 includes reserve capacity 914 for bad block substitutions, for storing metadata, for storing invalid data, and the like and object store capacity 916 for storing object store data. The reserve capacity 914 and the object store capacity 916, in certain embodiments, may be managed together, as available metadata capacity or system capacity, and adjusted based on capacity demands. While the reported capacity 912, the reserve capacity 914, and the object store capacity 916 are depicted logically as being separated, as described above, in certain embodiment, workload data, object store data, system metadata, and the like use the same write path and are written to an append point of a sequential, log-based writing structure, so that the workload data, object store data, system metadata, and the like are intermingled on the physical solid-state storage media 110. Further, in the depicted embodiment, each set of LBAs 902, 904, 906 is illustrated as a contiguous range of LBAs. In other embodiments, the first set of LBAs 902 and the object store set of LBAs 906 may be noncontiguous, interspersed using one or more hashing functions or other address mapping functions, or otherwise intermingled through the logical address space 900, instead of being disposed in contiguous ranges.

In the depicted embodiment, an object store set of LBAs 906 comprises a restricted set of LBAs 906 and is a part of a larger restricted set of LBAs 904, 906. Alternatively, in another embodiment, the object store set of LBAs 906 may be a single restricted set of LBAs 906, with the set of LBAs 904 between LBA N and LBA X not being a restricted set. A restricted set of LBAs is inaccessible using a block device interface. In one embodiment, the size of the object store set of LBAs 906 is dynamic, and may grow or shrink dynamically as data objects are added to or removed from the object store. In another embodiment, the size of the object store set of LBAs 906 is static. For example, a client 114, in one embodiment, may request a certain size for an object store set of LBAs 906 using a create object store command, requesting a certain number of key values, requesting a certain size of object store index 802, or the like and the size for the object store set of LBAs 906 may be based on the client request. The size of the object store set of LBAs 906, in certain embodiments, is selected not to exceed the reserve capacity 914 of the solid-state storage device 102. In other embodiments, the size of the object store set of LBAs 906 may be allowed to grow into the reported capacity 912. In one embodiment, the size allocated for the object store set of LBAs 906 is a logical or virtual allocation and does not use or reserve physical storage capacity 910 of the solid-state storage device 102 until data objects are stored in the object store set of LBAs 906 and the corresponding LBAs are mapped to physical locations on the solid-state storage device 102 that store the data objects.

In embodiments where one or more additional LBAs 904 exist in the logical address space 900, the additional LBAs 904 may be restricted or unrestricted. The additional LBAs 904, in one embodiment, may be unused. In another embodiment, the additional LBAs 904 may be allocated to additional object stores, or for other functions of the solid-state storage device 102.

Figure 10:
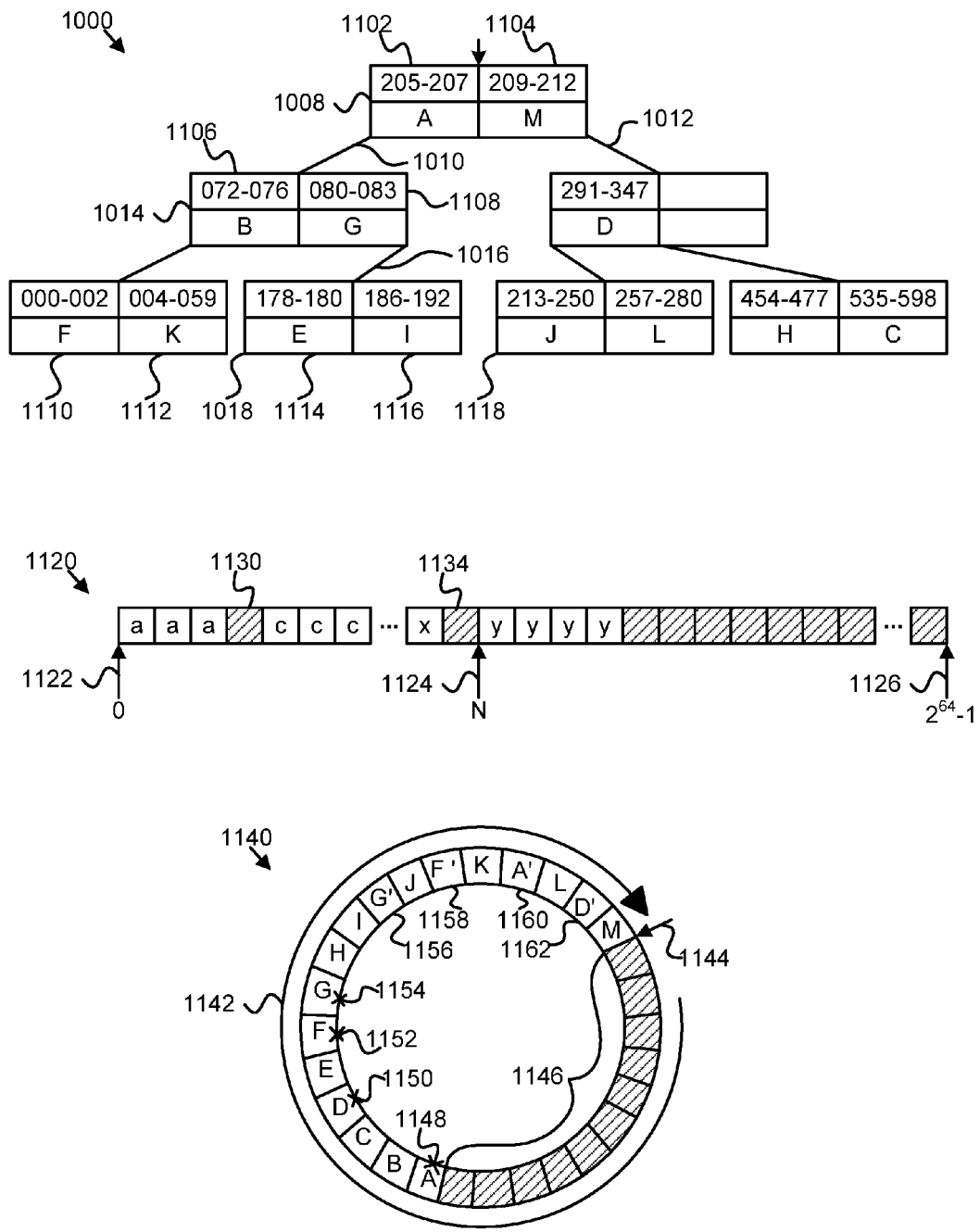
FIG. 10 is a schematic block diagram illustrating one embodiment of a mapping structure, a logical address space, and a log-based writing structure in accordance with the present invention.

FIG. 10 depicts one embodiment of a mapping structure 1000, a logical address space 1120, and a sequential, log-based, append-only writing structure 1140. The mapping structure 1000, in one embodiment, is maintained by the logical-to-physical translation layer 512 of the storage controller 506 to map LBAs or other logical addresses to physical locations on the solid-state storage media 110. The mapping structure 1000, in the depicted embodiment, is a B-tree with several entries. In the depicted embodiment, the nodes of the mapping structure 1000 include direct references to physical locations in the solid-state storage device 102. In other embodiments, the mapping structure 1000 may include links that map to entries in a reverse map, or the like. The mapping structure 1000, in various embodiments, may be used either with or without a reverse map. In other embodiments, the references in the mapping structure 1000 may include alpha-numerical characters, hexadecimal characters, pointers, links, and the like.

The mapping structure 1000, in the depicted embodiment, includes a plurality of nodes. Each node, in the depicted embodiment, is capable of storing two entries. In other embodiments, each node may be capable of storing a greater number of entries, the number of entries at each level may change as the mapping structure 1000 grows or shrinks through use, or the like.

Each entry, in the depicted embodiment, maps a variable length range of LBAs of the solid-state storage device 102 to a physical location in the storage media 110 for the solid-state storage device 102. Further, while variable length ranges of LBAs, in the depicted embodiment, are represented by a starting address and an ending address, in other embodiments, a variable length range of LBAs may be represented by a starting address and a length, or the like. In one embodiment, the capital letters 'A' through 'M' represent a logical or physical erase block in the physical storage media 110 of the solid-state storage device 102 that stores the data of the corresponding range of LBAs. In other embodiments, the capital letters may represent other physical addresses or locations of the solid-state storage device 102. In the depicted embodiment, the capital letters 'A' through 'M' are also depicted in the log-based writing structure 1140 which represents the physical storage media 110 of the solid-state storage device 102.

In the depicted embodiment, membership in the mapping structure 1000 denotes membership (or storage) in the solid-state storage device 102. In another embodiment, an entry may further include an indicator of whether the solid-state storage device 102 stores data corresponding to a logical block within the range of LBAs, data of a reverse map, and/or other data.

In the depicted embodiment, the root node 1008 includes entries 1102, 1104 with noncontiguous ranges of LBAs. A "hole" exists at LBA "208" between the two entries 1102, 1104 of the root node. In one embodiment, a "hole" indicates that the solid-state storage device 102 does not store data corresponding to one or more LBAs corresponding to the "hole." In one embodiment, the solid-state storage device 102 supports block I/O requests (read, write, trim, etc.) with multiple contiguous and/or noncontiguous ranges of LBAs (i.e. ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 1106, 1108 of the node 1014, between the entries 1110, 1112 of the left child node of the node 1014, between entries 1114, 1116 of the node 1018, and between entries of the node 1118. In one embodiment, similar "holes" may also exist between entries in parent nodes and child nodes. For example, in the depicted embodiment, a "hole" of LBAs "060-071" exists between the left entry 1106 of the node 1014 and the right entry 1112 of the left child node of the node 1014.

The "hole" at LBA "003," in the depicted embodiment, can also be seen in the logical address space 1120 of the solid-state storage device 102 at logical address "003" 1130. The hash marks at LBA "003" 1140 represent an empty location, or a location for which the solid-state storage device 102 does not store data. The "hole" at LBA 1134 in the logical address space 1120, is due to one or more block I/O requests with noncontiguous ranges, a trim or other deallocation command to the solid-state storage device 102, or the like.

The logical address space 1120 of the solid-state storage device 102, in the depicted embodiment, is larger than the physical storage capacity and corresponding storage device address space of the solid-state storage device 102. In the depicted embodiment, the solid-state storage device 102 has a 64 bit logical address space 1120 beginning at logical address "0" 1122 and extending to logical address "$2^{64}-1$" 1126. Because the storage device address space corresponds to only a subset of the logical address space 1120 of the solid-state storage device 102, the rest of the logical address space 1120 may be restricted, and used for an object store as described above, or used for other functions of the solid-state storage device 102.

The sequential, log-based, append-only writing structure 1140, in the depicted embodiment, is a logical representation of the physical storage media 110 of the solid-state storage device 102. In certain embodiments, the solid-state storage device 102 stores data sequentially, appending data to the log-based writing structure 1140 at an append point 1144. The solid-state storage device 102, in a further embodiment, uses a storage space recovery process, such as a garbage collection module or other storage space recovery module that re-uses non-volatile storage media 110 storing deallocated/unused logical blocks. Non-volatile storage media storing deallocated/unused logical blocks, in the depicted embodiment, is added to an available storage pool 1146 for the solid-state storage device 102. By clearing invalid data from the solid-state storage device 102, as described above, and adding the physical storage capacity corresponding to the cleared data back to the available storage pool 1146, in one embodiment, the log-based writing structure 1140 is cyclic, ring-like, and has a theoretically infinite capacity.

In the depicted embodiment, the append point 1144 progresses around the log-based, append-only writing structure 1140 in a circular pattern 1142. In one embodiment, the circular pattern 1142 wear balances the solid-state storage media 110, increasing a usable life of the solid-state storage media 110. In the depicted embodiment, a garbage collection module or other storage capacity recovery process has marked several blocks 1148, 1150, 1152, 1154 as invalid, represented by an "X" marking on the blocks 1148, 1150, 1152, 1154. The garbage collection module, in one embodiment, will recover the physical storage capacity of the invalid blocks 1148, 1150, 1152, 1154 and add the recovered capacity to the available storage pool 1146. In the depicted embodiment, modified versions of the blocks 1148, 1150, 1152, 1154 have been appended to the log-based writing structure 1140 as new blocks 1156, 1158, 1160, 1162 in a read, modify, write operation or the like, allowing the original blocks 1148, 1150, 1152, 1154 to be recovered.

In one embodiment, workload data and object store data are intermingled in the log-based writing structure 1140. The mapping structure 1000, in a further embodiment, maps LBAs for both workload data and object store data to physical locations on the solid-state storage media 110 of the log-based writing structure 1140. In this manner, a garbage collection module or other storage recovery process services both workload data and object store data, and both workload data and object store data receive the same data protection characteristics.

Figure 11:
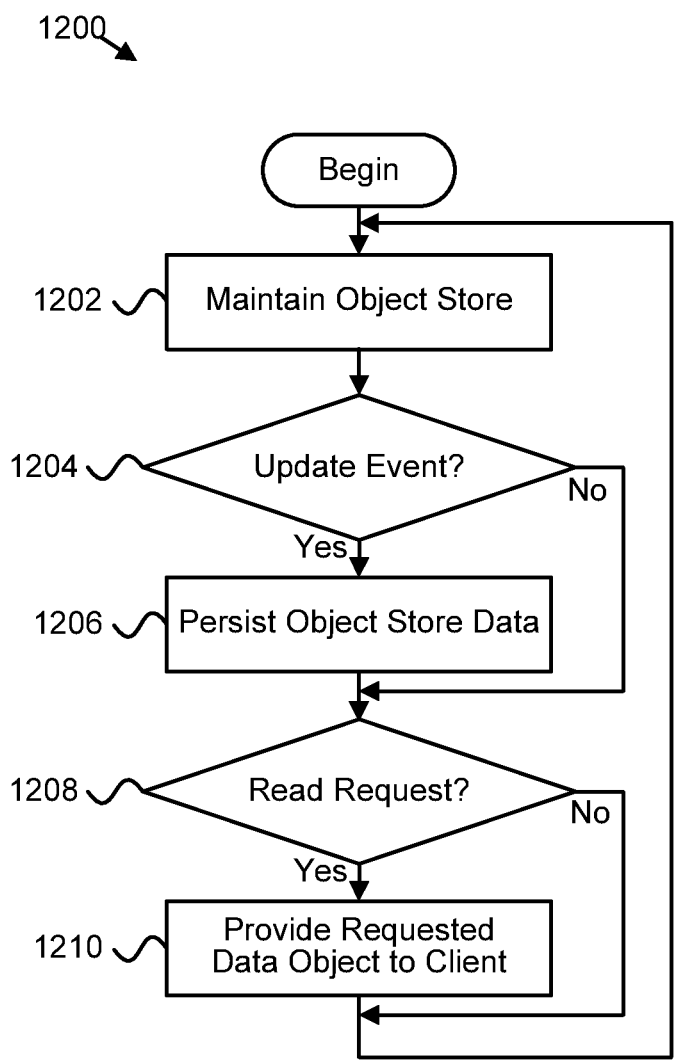
FIG. 11 is a schematic flow chart diagram illustrating one embodiment of a method for persistently storing data objects in accordance with the present invention.

FIG. 11 depicts one embodiment of a method 1200 for persistently storing data objects. The method 1200 begins, and the object store index module 602 maintains 1202 an object store. The object store, in certain embodiments, associates data objects with unique key values. The storage module 604 determines 1204 whether there has been an update event. If the storage module 604 determines 1204 that there has been an update event, the storage module 604 persists 1206 object store data defining the object store to an LBA of a solid-state storage device 102. The LBA, in one embodiment, is a member of a restricted set of LBAs. If the storage module 604 determines 1204 that there has not been an update event, the storage module 604 skips the persisting 1206 step.

The read module 606 determines 1208 whether there has been a read request. If the read module 606 detects 1208 a read request, the read module 606 provides 1210 a requested data object to a requesting client 114. The read request, in certain embodiments, includes a key value associated with the requested data object. If the read module 606 determines 1206 that there has not been a read request, the read module 606 skips the providing 1210 step. The method returns and the object store index module 602 continues to maintain 1202 the object store.

Figure 12:
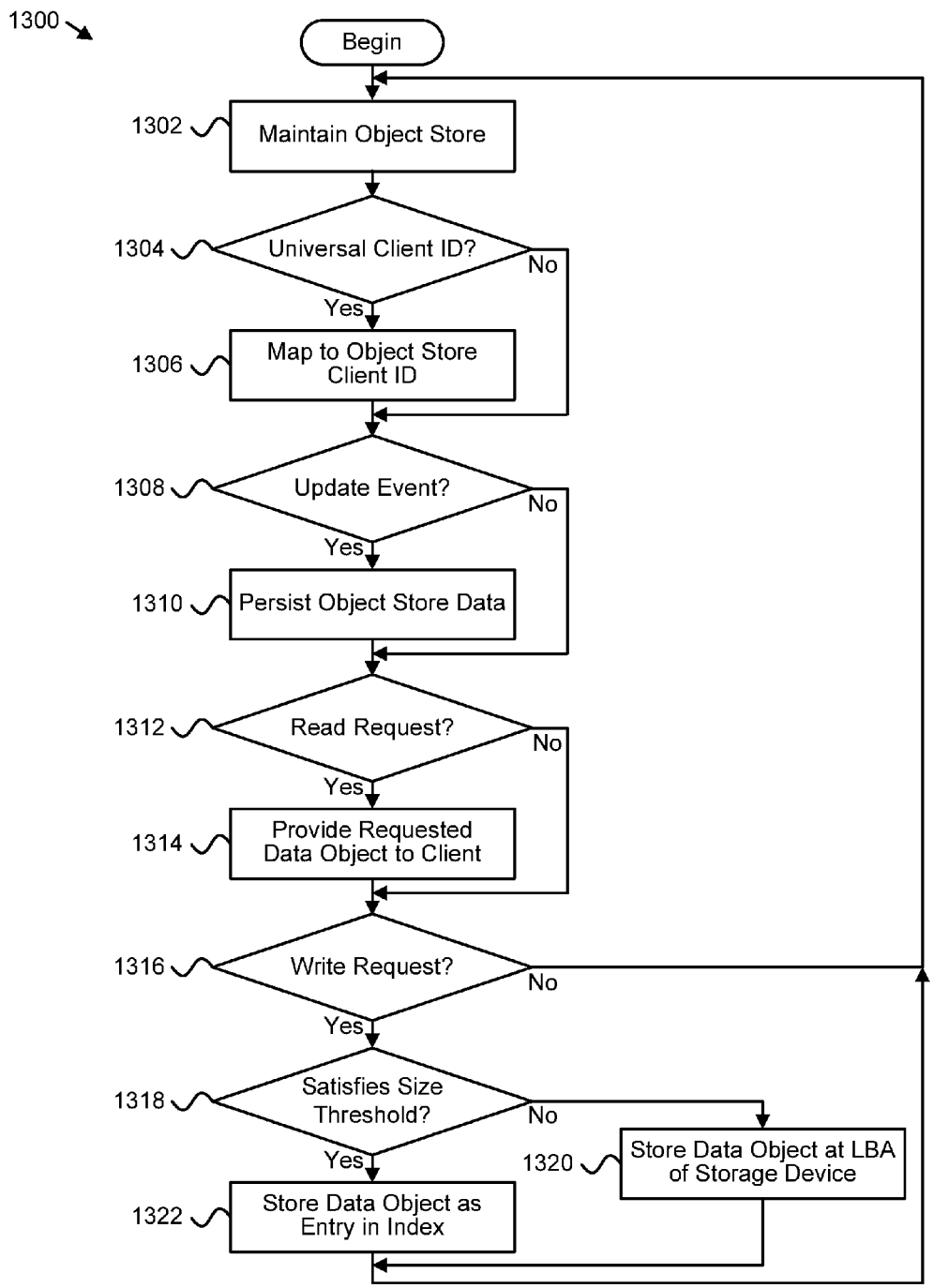
FIG. 12 is a schematic flow chart diagram illustrating another embodiment of a method for persistently storing data objects in accordance with the present invention.

FIG. 12 depicts another embodiment of a method 1300 for persistently storing data objects. The method 1300 begins, and the object store index module 602 maintains 1302 an object store. The object store, in certain embodiments, associates data objects with unique key values. The identifier mapping module 712 determines 1304 whether the identifier mapping module 712 has received a universal client identifier for mapping. If the identifier mapping module 712 determines 1304 that there is a universal client identifier for mapping, the identifier mapping module 712 maps 1306 maps 1306 the universal client identifier to an object store client identifier for a requesting client 114. If the identifier mapping module 712 determines 1304 that there is not a universal client identifier for mapping, the identifier mapping module 712 skips the mapping 1306 step.

The storage module 604 determines 1308 whether there has been an update event. If the storage module 604 determines 1308 that there has been an update event, the storage module 604 persists 1310 object store data defining the object store to an LBA of a solid-state storage device 102. The LBA, in one embodiment, is a member of a restricted set of LBAs. If the storage module 604 determines 1308 that there has not been an update event, the storage module 604 skips the persisting 1310 step.

The read module 606 determines 1312 whether there has been a read request. If the read module 606 detects 1312 a read request, the read module 606 provides 1314 a requested data object to a requesting client 114. The read request, in certain embodiments, includes a key value associated with the requested data object. If the read module 606 determines 1312 that there has not been a read request, the read module 606 skips the providing 1314 step.

The write module 702 determines 1316 whether there has been a write request. If the write module 702 determines 1316 that there has not been a write request, the method returns and the object store index module 602 continues to maintain 1302 the object store. If the write module 702 detects 1316 a write request, the write module 702 determines 1318 whether the size of the data object of the write request satisfies 1318 a size threshold. If the size of the data object satisfies 1318 the size threshold, the write module 702 stores 1322 the received data object as an entry in an index for the object store. If the size of the data object does not satisfy 1318 the size threshold, the write module 702 stores 1320 the received data object at an LBA of the solid-state storage device 102. In one embodiment, the LBA is a member of a restricted set of LBAs. The method returns and the object store index module 602 continues to maintain 1302 the object store.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   maintaining an object store, the object store associating each data object of a plurality of data objects with a unique key value;
   persisting data of the object store to a restricted set of logical block addresses of a logical address space, wherein the logical block addresses are mappable to any of a plurality of physical storage locations of the solid-state storage device, the object store data comprising an object store index;
   storing a received data object within the object store index in response to a size of the received data object being less than or equal to a size threshold;
   storing the received data object at a logical block address separate from the object store index in response to the size of the received data object being greater than the size threshold, wherein the associated logical block address is a member of the restricted set of logical block addresses; and
   providing a requested data object from the plurality of data objects to a requesting client in response to receiving a read request for the requested data object from the requesting client, the read request comprising the key value associated with the requested data object.

2. The method of claim 1, wherein persisting the object store data to the logical block address comprises inserting the object store data into a write path for the solid-state storage device, the write path comprising both the object store data and workload data such that the object store data receives the same data protection characteristics as the workload data.

3. The method of claim 1, wherein persisting the object store data to the logical block address of the solid-state storage device comprises writing the object store data to an append point of a sequential log-based writing structure persisted on the solid-state storage device, the sequential log-based writing structure storing the object store data and workload data.

4. The method of claim 3, wherein the sequential log-based writing structure stores the object store data and the workload data using a mapping structure maintained by a storage controller, the mapping structure associating logical block addresses of a logical address space of the solid-state storage device with physical storage locations of the solid-state storage device for the object store data and the workload data.

5. The method of claim 1, wherein the logical block address for the object store data is a member of a sparse address space that is greater than a physically addressable capacity of the solid-state storage device and the sparse address space comprises a first set of logical block addresses that is available to clients of the solid-state storage device through a block device interface and the restricted set of logical block addresses that is unavailable to clients of the solid-state storage device through the block device interface.

6. The method of claim 1, wherein data stored in the restricted set of logical block addresses is at least one of, available to clients of the solid-state storage device exclusively through an object store interface; and unavailable to clients of the solid-state storage device through a block device interface.

7. The method of claim 1, further comprising mapping a universal client identifier for the requesting client to an object store client identifier for the requesting client using a known mapping, wherein one or more key values and associated data objects of the object store are associated with the object store client identifier.

8. The method of claim 1, wherein clients of a same client type share a same object store client identifier and are associated with a same set of key values and associated data objects of the object store.

9. The method of claim 1, further comprising adding a received data object to the object store in response to receiving a write request from the requesting client.

10. The method of claim 9, further comprising one of receiving a key value associated with the received data object from the requesting client with the write request; and generating a key value associated with the received data object in response to receiving the write request and sending the generated key value to the requesting client.

11. The method of claim 1, wherein each key value comprises one or more of a client identifier, a section identifier, and a key identifier, the client identifier associated with the requesting client, the section identifier associated with a group of data objects comprising an associated data object, the group of data objects having a common characteristic, and the key identifier identifying the associated data object.

12. An apparatus, comprising:
- an object store index module that maintains an object store comprising an object store index comprising entries that map data objects stored on a solid-state storage medium to respective unique key values;
- a storage controller of the solid-state storage medium that stores data of the object store, including the object store index, within a restricted set of logical block addresses of a logical address space;
- a write module that stores a received data object within the object store index in response to a size of the received data object satisfying a size threshold, and stores the received data object outside of the object store index at a different logical block address within the restricted set of logical block addresses in response to the size of the received data object exceeding the size threshold; and
- a read module that provides a requested data object from the plurality of data objects to a requesting client in response to receiving a read request for the requested data object from the requesting client, the read request comprising the key value associated with the requested data object.

13. The apparatus of claim 12, further comprising an identifier mapping module that maps a universal client identifier for the requesting client to an object store client identifier for the requesting client using a known mapping, wherein one or more key values and associated data objects of the object store are associated with the object store client identifier.

14. The apparatus of claim 12, wherein the storage module intermingles the object store data with the workload data by writing the object store data to an append point of a sequential log-based writing structure persisted on the solid-state storage medium, the sequential log-based writing structure storing the object store data and the workload data.

15. A system, comprising:
- a solid-state storage device in communication with a host device;
- a device driver for the solid-state storage device, the device driver executing on the host device, the device driver comprising,
  - an object store index module that maintains an object store, the object store associating each data object of a plurality of data objects with a unique key value by use of an object store index;
  - a storage module that persists object data including the object store index within a restricted set of logical block addresses of a logical address space of the solid-state storage device;
- a write module to store a received data object within the object store index if the received data object satisfies a size threshold, and stores the received data object outside of the object store index at a different logical block address within the restricted set of logical block addresses if the received data object does not satisfy the size threshold; and
- a read module that provides a requested data object from the plurality of data objects to a requesting client in response to receiving a read request for the requested data object from the requesting client, the read request comprising the key value associated with the requested data object.

16. The system of claim 15, wherein the device driver for the solid-state storage device provides access to data stored in the restricted set of logical block addresses exclusively through an object store interface.

17. The system of claim 15, wherein the device driver for the solid-state storage device provides access to data stored in logical block addresses associated with a reported capacity of the solid-state storage device through a block device interface for the solid-state storage device, data stored in the restricted set of logical block addresses unavailable through the block device interface.

18. The system of claim 15, further comprising the host device, the requesting client comprising one of a plurality of clients executing on the host device, the plurality of clients in communication with the solid-state storage device through the device driver.

* * * * *